US012634211B2

(12) United States Patent
Marquezan et al.

(10) Patent No.: US 12,634,211 B2
(45) Date of Patent: *May 19, 2026

(54) NETWORK ENTITIES FOR SUPPORTING ANALYTICS GENERATION

(71) Applicant: HUAWEI TECHNOLOGIES CO., LTD., Shenzhen (CN)

(72) Inventors: Clarissa Marquezan, Munich (DE); Riccardo Trivisonno, Munich (DE); Qing Wei, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 115 days.

This patent is subject to a terminal disclaimer.

(21) Appl. No.: 18/801,097

(22) Filed: Aug. 12, 2024

(65) Prior Publication Data

US 2024/0406084 A1      Dec. 5, 2024

Related U.S. Application Data

(63) Continuation of application No. 17/739,997, filed on May 9, 2022, now Pat. No. 12,081,421, which is a
(Continued)

(51) Int. Cl.
*H04L 43/062*        (2022.01)
*H04L 41/0806*       (2022.01)

(52) U.S. Cl.
CPC ........ *H04L 43/062* (2013.01); *H04L 41/0806* (2013.01)

(58) Field of Classification Search
CPC ... H04L 43/062; H04L 41/0806; H04L 41/40; H04L 43/12; H04L 43/20; H04L 41/0803; H04L 41/14; H04W 24/08; H04W 88/14
See application file for complete search history.

(56) References Cited

U.S. PATENT DOCUMENTS 5,448,729 A      9/1995   Murdock
7,308,237 B2    12/2007   Kokkonen et al.
(Continued)

FOREIGN PATENT DOCUMENTS

CN        109769269 A      5/2019
CN        110351229 A     10/2019
(Continued)

OTHER PUBLICATIONS

Nokia et al., "Update to solution 14," SA WG2 Meeting #129b, West Palm Beach, USA, S2-1812751 (revision of S2-1811688 & S2-1812007) total 6 pages, 3rd Generation Partnership Project, Valbonne, France (Nov. 26-30, 2018).
(Continued)

*Primary Examiner* — Michael Won
(74) *Attorney, Agent, or Firm* — Leydig, Voit & Mayer, Ltd.

(57)        ABSTRACT

The present invention relates to the generation of analytics information in a mobile network. To this end, the invention proposes network entities and corresponding methods that support the analytics generation. In particular, the network entities and methods facilitate the gathering of information required for the analytics generation. In particular, a network entity for analytics generation is configured to obtain network slice association (NSA information and/or user plane association (UPA) information from one or more other network entities, wherein the NSA information indicates a relation between an Access Network (AN) property and a Core Network (CN) property, and the UPA information indicates a network entity configured to transmit data traffic to and/or from a user equipment in the network. Further, the network entity is configured to provide analytics information, the analytics information being based on the obtained NSA information and/or UPA information.

12 Claims, 11 Drawing Sheets

Related U.S. Application Data continuation of application No. PCT/EP2019/080557, filed on Nov. 7, 2019.

(56) References Cited

U.S. PATENT DOCUMENTS

| | | | |
|---|---|---|---|
| 7,317,910 B2 | 1/2008 | Niemenmaa et al. | |
| 9,398,625 B2 | 7/2016 | Sadeh et al. | |
| 10,448,320 B2 | 10/2019 | Vrzic et al. | |
| 10,667,179 B1 | 5/2020 | Young et al. | |
| 10,986,010 B2 | 4/2021 | Kodaypak et al. | |
| 11,570,054 B2 * | 1/2023 | Vaishnavi | H04L 47/82 |
| 2014/0269535 A1 | 9/2014 | Pazhyannur et al. | |
| 2017/0079059 A1 | 3/2017 | Li et al. | |
| 2018/0262924 A1 | 9/2018 | Dao et al. | |
| 2018/0359337 A1 | 12/2018 | Kodaypak et al. | |
| 2019/0215731 A1 | 7/2019 | Qiao et al. | |
| 2019/0274032 A1 | 9/2019 | Chatterjee et al. | |
| 2019/0281494 A1 | 9/2019 | Chan et al. | |
| 2019/0320494 A1 | 10/2019 | Jayawardene et al. | |
| 2020/0178196 A1 | 6/2020 | Wang et al. | |
| 2020/0195495 A1 | 6/2020 | Parker et al. | |
| 2020/0304983 A1 | 9/2020 | Zhu et al. | |
| 2020/0359440 A1 | 11/2020 | Qiao et al. | |
| 2021/0014711 A1 | 1/2021 | Miao | |
| 2021/0022024 A1 | 1/2021 | Yao et al. | |
| 2021/0105656 A1 | 4/2021 | Estevez et al. | |
| 2021/0153254 A1 | 5/2021 | Zhu et al. | |
| 2021/0168643 A1 | 6/2021 | Yao et al. | |
| 2021/0185695 A1 | 6/2021 | Gupta et al. | |
| 2021/0400757 A1 | 12/2021 | Dhanani et al. | |
| 2021/0409301 A1 | 12/2021 | Salkintzis et al. | |
| 2022/0015174 A1 | 1/2022 | Aramoto et al. | |
| 2022/0022090 A1 | 1/2022 | Schliwa-Bertling et al. | |
| 2022/0116969 A1 | 4/2022 | He et al. | |
| 2023/0164686 A1 | 5/2023 | Estevez | |

FOREIGN PATENT DOCUMENTS

| | | |
|---|---|---|
| EP | 1924114 B1 | 11/2015 |
| WO | 2015134751 A1 | 9/2015 |
| WO | 2019032968 A1 | 2/2019 |
| WO | 2019158777 A1 | 8/2019 |

OTHER PUBLICATIONS

"3rd Generation Partnership Project; Technical Specification Group Services and System Aspects; Study on Enablers for Network Automation for 5G—phase 2 (Release 17)," 3GPP TR 23.700-91 V0.1.0, total 13 pages, 3rd Generation Partnership Project, Valbonne, France (Oct. 2019).

Orange, "NF instance discovery," 3GPP TSG-SA WG2 Meeting #133, USA, S2-1905576, total 4 pages, 3rd Generation Partnership Project, Valbonne, France (May 13-17, 2019).

"3rd Generation Partnership Project; Technical Specification Group Services and System Aspects; Architecture enhancements for 5G System (5GS) to support network data analytics services (Release 16)," 3GPP TS 23.288 V16.1.0, total 52 pages, 3rd Generation Partnership Project, Valbonne, France (Sep. 2019).

"3rd Generation Partnership Project; Technical Specification Group Services and System Aspects; Procedures for the 5G System (5GS);

Stage 2 (Release 16)," 3GPP TS 23.502 V16.2.0, total 525 pages, 3rd Generation Partnership Project, Valbonne, France (Sep. 2019).

China Mobile, "Update the correlation information," 3GPP TSG-SA WG2 Meeting #133, Reno, USA, S2-1905160 (Revision of S2-190xxxx), total 4 pages, 3rd Generation Partnership Project, Valbonne, France (May 13-17, 2019).

"3rd Generation Partnership Project; Technical Specification Group Services and System Aspects; Management and orchestration; 5G performance measurements (Release 16)," 3GPP TS 28.552 V16.3.0, total 130 pages, 3rd Generation Partnership Project, Valbonne, France (Sep. 2019).

Orange, "NF instance discovery," 3GPP TSG-SA WG2 Meeting #133, Reno, USA, S2-1906151 (rev. of 6114), total 3 pages, 3rd Generation Partnership Project, Valbonne, France (May 13-17, 2019).

"3rd Generation Partnership Project; Technical Specification Group Services and System Aspects; System Architecture for the 5G System (5GS); Stage 2 (Release 16)," 3GPP TS 23.501 V16.2.0, total 391 pages, 3rd Generation Partnership Project, Valbonne, France (Sep. 2019).

"3rd Generation Partnership Project; Technical Specification Group Services and System Aspects; Policy and Charging Control Framework for the 5G System (5GS); Stage 2 (Release 16)," 3GPP TS 23.503 V16.2.0, total 104 pages, 3rd Generation Partnership Project, Valbonne, France (Sep. 2019).

"3rd Generation Partnership Project; Technical Specification Group Radio Access Network; Ng-Ran; Ng Application Protocol (NGAP)(Release 15)," 3GPP TS 38.413 V15.5.0, total 329 pages, 3rd Generation Partnership Project, Valbonne, France (Sep. 2019).

"3rd Generation Partnership Project; Technical Specification Group Services and System Aspects; Management and orchestration; Performance assurance (Release 16)," 3GPP TS 28.550 V16.2.0, total 92 pages, 3rd Generation Partnership Project, Valbonne, France (Sep. 2019).

"3rd Generation Partnership Project; Technical Specification Group Services and System Aspects; Management and orchestration; Generic management services; (Release 16)," 3GPP TS 28.532 V16.1.0, total 206 pages, 3rd Generation Partnership Project, Valbonne, France (Sep. 2019).

"3rd Generation Partnership Project; Technical Specification Group Core Network and Terminals; 5G System; Common Data Types for Service Based Interfaces; Stage 3 (Release 16)," 3GPP TS 29.571 V16.1.1, total 83 pages, 3rd Generation Partnership Project, Valbonne, France (Oct. 2019).

"3rd Generation Partnership Project; Technical Specification Group Core Network and Terminals; 5G System; Network Function Repository Services; Stage 3 (Release 16)," 3GPP TS 29.510 V16.1.1, total 150 pages, 3rd Generation Partnership Project, Valbonne, France (Oct. 2019).

"3rd Generation Partnership Project; Technical Specification Group Services and System Aspects; Management and orchestration; 5G Network Resource Model (NRM); Stage 2 and stage 3 (Release 16)," 3GPP TS 28.541 V16.2.0, total 313 pages, 3rd Generation Partnership Project, Valbonne, France (Sep. 2019).

Samsung, "Remaining Issues on Handling of SLRB configuration," 3GPP TSG-RAN WG2 Meeting #107bis, Chongqing, China, R2-1912440, total 3 pages, 3rd Generation Partnership Project, Valbonne, France (Oct. 14-18, 2019).

U.S. Appl. No. 17/739,997, filed May 9, 2022.

* cited by examiner

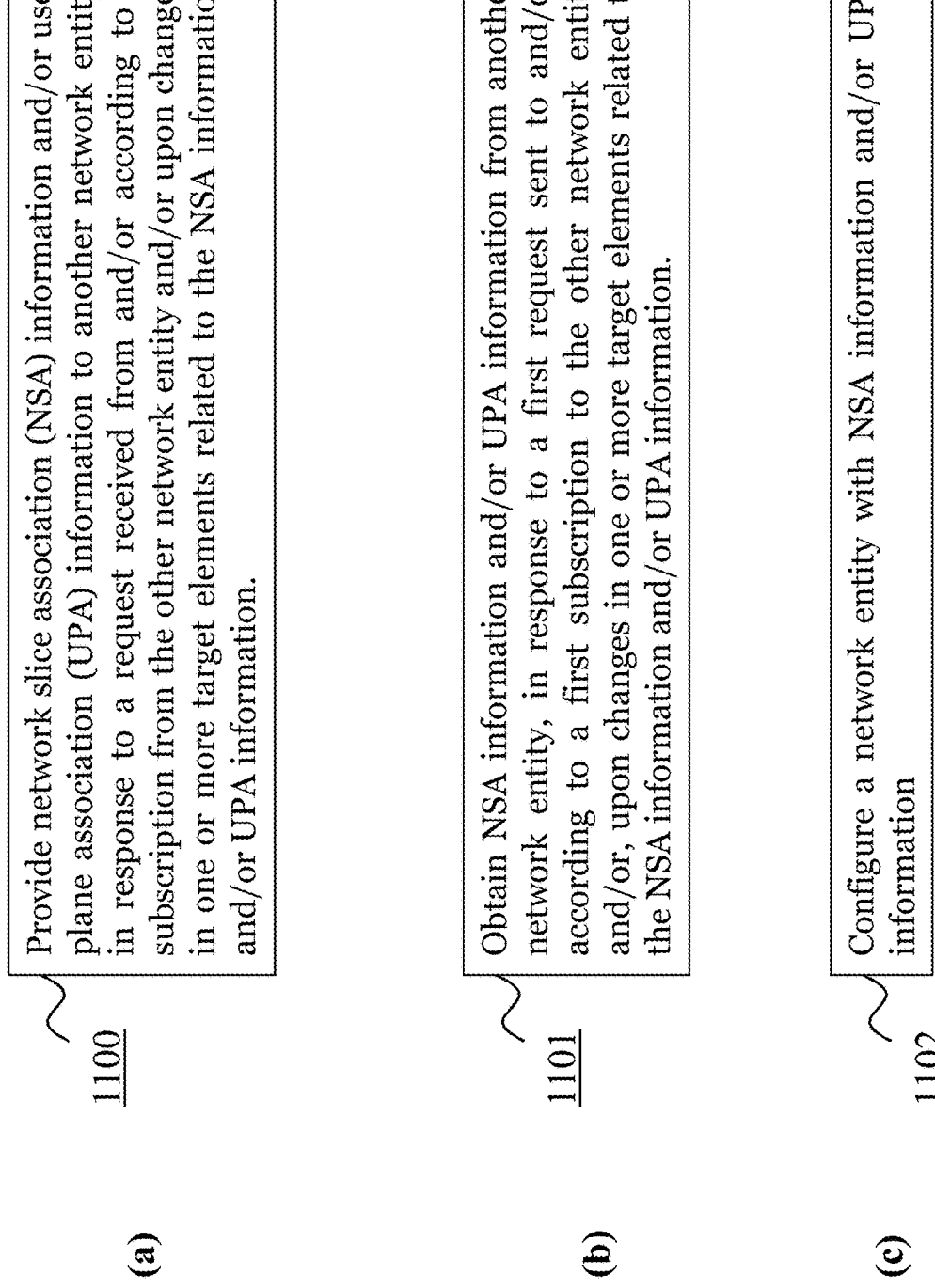

Provide network slice association (NSA) information and/or user plane association (UPA) information to another network entity, in response to a request received from and/or according to a subscription from the other network entity and/or upon changes in one or more target elements related to the NSA information and/or UPA information.

1100

Obtain NSA information and/or UPA information from another network entity, in response to a first request sent to and/or according to a first subscription to the other network entity and/or, upon changes in one or more target elements related to the NSA information and/or UPA information.

1101

Configure a network entity with NSA information and/or UPA information

NETWORK ENTITIES FOR SUPPORTING ANALYTICS GENERATION

CROSS-REFERENCE TO RELATED APPLICATIONS

This application is a continuation of U.S. patent application Ser. No. 17/739,997, filed on May 9, 2022, which is a continuation of International Application No. PCT/EP2019/080557, filed on Nov. 7, 2019. All of the afore-mentioned patent applications are hereby incorporated by reference in their entireties.

TECHNICAL FIELD

The present disclosure relates to a new generation mobile network, and in particular to the generation of analytics information in the network. To this end, the disclosure proposes network entities and corresponding methods that support the analytics generation. In particular, the network entities and methods facilitate the gathering of information required for the analytics generation.

BACKGROUND

FIG. 1 illustrates an example of a mobile network based, which is on the 5G architecture, as per the 3GPP TS 23.501 specification. In particular, FIG. 1 shows the separation of the mobile network among: a management plane, a control Plane, and user plane. Further, the separation of the mobile network among: an Access Network (AN), a Core Network (CN), and a Data Network (DN).

The mobile network operator can deploy and manage, via the management plane, different network slices. The management plane configures and manages the resources and entities associated with the network slice in both the ANs and the CNs. Each network slice will have associated to it control plane entities and user plane entities that are related, i.e., they belong to the same network slice. For simplicity, FIG. 1 illustrates only one network slice, which is identified by S-NSSAI #1, and illustrates the core plane and user plane entities associated with the network slice S-NSSAI #1. The control plane entities manage the connections of the User Equipments (UEs) at the user plane from N3 to the DN (including the control over the N9 connecting multiple User Plane Functions (UPFs)), while the user plane entities are the ones that actually transmit the data traffic related to the UEs and apply control actions/policies defined by the control plane entities.

The Network Data Analytics Function (NWDAF) is the network function in a 5G System (5GS), which is able to generate analytics information. In order to generate analytics information for specific UEs and/or specific groups of UEs, or Network Functions (NFs), or Applications, etc., the NWDAF needs to collect data from the NFs in the 5GS, or from external Application Functions (AFs), as well as from the Operation, Administration and Maintenance (OAM)/management plane. Examples of the data to be collected by the NWDAF are:

Location information of the UEs.

AN throughput per Tracking Area (TA), which is composed by a set of cells, where the UE is located, and per network slice that the UE is using in such TA.

UPF performance measurements associated with UE sessions, collected from OAM.

Service data (e.g., Mean Opinion Scores (MOS) from AFs, collected via Network Exposure Function (NEF), if 3$^{rd}$ Party AF, or directly from AF.

In 5GS Rel. 16, the NWDAF performs two different types of data collection:

Pre-data collection for determining the control plane NFs and/or external AFs serving UEs (see 3GPP TS 23.288 Clause 6.2.2.1, Table 6.2.2.1-2: NF Services consumed by NWDAF to determine, which NF instances are serving a UE). In this case, the NWDAF has to first:

Consume services of NFs, such as Unified Data Management (UDM), Unified Data Repository (UDR), or Network Repository Function (NRF), to determine the control plane NFs serving the UEs, and thus in a second step to trigger the collection of the actual data from the serving control plane NFS.

Raw data collection by:

Subscribing to events from NFs to collect raw data (e.g., events exposed by the Access and Mobility Management Function (AMF) or Session Management Function (SMF).

Consuming services from OAM related to Performance Management (PM) and/or Fault Management (FM) and/or Provisioning Management, in order to collect the management data.

The mechanisms defined in Rel. 16 for the pre-data collection are focused only on determining control plane NFs serving specific UEs that are used for the discovery of such NFs. However, many issues were not yet addressed, in particular how the NWDA can perform pre-data collection without high load.

SUMMARY

In particular, the inventors realized that the following issues were not addressed:

1. Certain analytics IDs require specific information on NFs and/or Applications and/or network measurements, and can be requested for an "area of interest" (which defines a geographical region of a mobile network, e.g., in term of list of TAIs and/or Cell IDs in such geographical region), and not specifically related to a certain UE(s).

For instance, there exist analytics IDs, which have as filters for subscription a specific geographical area, such as analytics IDs: Service Experience (3GPP TS 23.288 Clause 6.4) and User data congestion in a geographic area (3GPP TS 23.288 Clause 6.8.1).

In this case, the NWDAF is required to have a mapping of the tuple "(TAs, Cells ID, network slices, Network Slice Instances (NSIs)", in order to properly trigger the data collection in the specific area of interest. However, there exists no mechanism to determine, by the NWDAF, the association of TAs, and/or Cell IDs, and/or S-NSSAIs, and/or NSIs during the pre-data collection.

2. Certain analytics IDs generated by the NWDAF, such as Service Experience (3GPP TS 23.288 Clause 6.4) require information to be collected from UPFs. However, there exists no mechanism to determine, by the NWDAF, the UPFs (and any other UP information) that are serving UEs during the pre-data collection, such that the NWDAF could request the data collection for such UPFs.

3GPP TS 23.288 V16.0.0 specifies in Clause 6.2.2.1 mechanisms that define the control plane NF services, which need to be consumed by the NWDAF, in order to determine which control plane NFs are serving UEs. However, there is so far no definition of a mechanism, in which the NWDAF determines mapping of core network and access network associated with an area of interest and/or in which the NWDAF determines user and/or control plane entities related to the data traffic to and/or from UEs.

According to the inventors' analysis, the current options for determining the association among TAs, cells, network slices, and NSIs, in an area of interest, with any of the existing mechanisms, are incomplete and/or would lead to a significant increase of the load for pre-data collection:

Option 1: NWDAF subscription to event Location Events from UDM or AMF, as well as AMF Location information service (as defined in 3GPP TS 23.502 V16.1.1).

UDM and AMF expose, via event exposure, information about UE location, and the AMF offers the service to track UE location, for instance, in terms of Cells, TA, Geodetic Location as defined in TS 23.502 Clause 5.2.2.5. This information exposed by UDM/AMF allows for the mapping of individual and/or groups of UEs to Cells and/or TAs. However, for the NWDAF to have the mapping of all Cell ID mapped to TAs, the NWDAF must subscribe to all UDM/AMF to consume the events of "any UE". Therefore, the load of pre-data collection is increased significantly. In addition, the information is not complete, because the NWDAF would still not have the information, which Cells, TA, are associated with which network slices and/or NSIs, This information is kept by UDM/AMF with the association UE×S-NSSAI/NSI, and not clearly connected to UE×Cell×TA.

Option 2: NWDAF subscription to NRF status updates in NF profiles.

Certain NF Profiles, such as AMF, SMF in NRF, contain the list of TAIs they are associated with, as well as the list of S-NSSAIs and NSIs associated with such NFs. Thus, the NWDAF could subscribe to the NRF services to receive updates in the NF profiles of such NF Types.

However, the NF Profile information is not complete, because:

The TAI information does not contain any information of the Cells associated with the TAI (as described in 3GPP TS 29.571);

There is no direct association of which TAI is associated with each S-NSSAI and/or NSI.

In addition, this type of usage of the NRF services would lead to an increase of the load of data collection, and waste of resources, because:

For any update in an NF Profile (TS 23.502, Clause 5.2.7.2.5), the NWDAF would be notified.

Updates on Load, or capacity (two NF profile parameters of any NF) can change dynamically over time, and can be used for the NF selection (e.g., TS 23.501 Clause 6.3.2 and 6.3.5). For every change in any of these parameters of the NFs, the NWDAF subscribed at the NRF will receive a notification. However, as long as the TAI of such NFs did not change, such information is useless for the NWDAF.

Option 3: NWDAF subscription to NSSF service on NSSAI availability, as defined in 3GPP TS 23.502 Clause 5.2.16.3.

The NWDAF can consume the NSSF services to obtain the mapping on the availability of S-NSSAIs (i.e., allowed network slices and/or NSIs) per TA.

However, this service still fails to provide the information, which Cells are associated with which TAs. This information is available to the NWDAF only by subscribing to UE location events exposed by AMF, which means that the NWDAF would need to subscribe to two different sources of information to obtain the complete mapping of Cells×TAs.

Further, according to the inventors' analysis, the current limitations of the existing mechanisms for determining UP NFs serving UEs are:

Option 1: SMF does not expose events with any information about UPFs, only about changes related to the DNN (TS 23.502 Clause 5.2.8.3.1), i.e., changes in the termination of interface N6 (which is the interface that connects the 5G mobile network to the DNN/DNAI). Changes in interface N3 (connecting RAN to UPFs) or interface N9 (UPFs to UPFs) are not exposed by SMF. The N3 and N9 changes are important for the NWDAF, because they define the UPFs, which the NWDAF needs to collect raw data for the generation of certain analytics IDs.

Option 2: In the NRF, the UPF Profile as well as the SMF Profile have a list of strings that determine the "SMF Serving Area" (TS 29.510). However, if more than one UPF is in the same SMF serving area of one SMF instance, there is no way to determine which UPF exactly is being used for sessions of UEs (i.e., the data traffic of UEs).

Option 3: UDM or UDR datasets (as defined in 3GPP TS 23.502) have only the SMF×UE×PDU ID mapping, and no information about the UPFs is associated with the PDU ID.

Option 4: Another option could be OAM/Management Plane provisioning services (3GPP TS 28.532) and resource models (3GPP TS 28.541), which can expose the information of the SMFs associated with the UPFs. However, the OAM cannot expose the information in a finer granularity of SMFs×UPFs×UEs mapping.

In view of the above-mentioned options and their limitations, embodiments of the present invention aim to provide an improved mechanism for pre-data collection for generating analytics information.

An objective is to provide network entities and methods, which can support the analytics generation with an enhanced pre-data collection. In particular, all necessary information for the analytics generation should be provided. Further, a load of the pre-data collection should be significantly reduced. The pre-data collection should include the determination of user plane association (UPA) information and/or of network slice association (NSA) information. The term association information is also used to denote "user plane association (UPA) information and/or of network slice association (NSA) information".

The objective is achieved by the embodiments of the invention as described in the enclosed independent claims. Advantageous implementations of the embodiments of the invention are further defined in the dependent claims.

A first aspect of the invention provides a network entity for analytics generation, the network entity being configured to: obtain NSA information and/or UPA information from one or more other network entities; wherein the NSA information indicates a relation between an AN property and a CN property, and the UPA information indicates a network entity configured to transmit data traffic to and/or from a user equipment in the network, and provide analytics information, the analytics information being based on the obtained NSA information and/or UPA information.

The network entity of the first aspect can acquire the NSA information and/or UPA information that is necessary for generating the analytics information. In particular, the network entity can obtain this association information with reduced signalling, and thus with reduced load. Accordingly, the network entity supports enhanced pre-data collection for the analytics generation.

In an implementation form of the first aspect, the network entity is further configured to: obtain the NSA information and/or UPA information by configuration from a management plane entity.

This is a simple and direct way for the network entity to obtain the NSA information and/or UPA information. For instance, the network entity may be configured by OAM.

In an implementation form of the first aspect, the network entity is further configured to: send a request and/or subscribe to one or more NFs; and obtain the NSA information and/or UPA information from the one or more NFs, in response to the request and/or according to the subscription.

The network entity can directly consume the association information necessary for generating the analytics information from the one or more NFs. The network entity may be configured to contact different types of NFs for the association information. The network entity has thus great flexibility to obtain the necessary information, while keeping the network load low.

In an implementation form of the first aspect, the request and/or the subscription respectively comprises a request and/or subscription for NSA and/or UPA information.

In an implementation form of the first aspect, the network entity is further configured to: send a plurality of requests and/or subscribe to a plurality of NFs; obtain the NSA information and/or UPA information from the plurality of NFs, in response to the plurality of requests and/or according to the subscriptions; aggregate the obtained NSA information and/or UPA information; and provide the analytics information, the analytics information being based on the aggregated NSA information and/or UPA information.

In an implementation form of the first aspect, the network entity is further configured to: send a request and/or subscribe to a determined NF; obtain the NSA information and/or UPA information from the determined NF, in response to the request and/or according to the subscription; and provide the analytics information, the analytics information being based on the obtained NSA information and/or UPA information.

The network entity can thus obtain the necessary information for generating the analytics information from one dedicated NF, also referred to as intermediary NF or the determined NF, since it may gather that information from other NFs. For the network entity of the first aspect, this is a very efficient option to obtain the association information it needs.

In an implementation form of the first aspect, the network entity is a control plane entity, in particular comprising a NWDAF.

A second aspect of the invention provides a network entity for supporting analytics generation, the network entity being configured to: provide NSA information and/or UPA information to another network entity, in response to a request received from and/or according to a subscription from the other network entity; wherein the NSA information indicates a relation between an AN property and a CN property, and the UPA information indicates a network entity configured to transmit data traffic to and/or from a user equipment in the network, and/or provide NSA information and/or UPA information to another network entity, upon changes in one or more target elements related to the NSA information and/or UPA information. The one or more target elements are related to the other network entity.

The network entity of the second aspect supports the analytic generation by providing the NSA and/or UPA information, for instance, to the network entity of the first aspect. In particular, the network entity of the second aspect supports pre-data collection for analytics generation with information that is, of today, not available to analytics generation.

In an implementation form of the second aspect, the network entity is a control plane NF, in particular comprising a SMF, and/or an AMF and/or a Network Slice Selection Function (NSSF) and/or NEF and/or AF and/or Network Repository Function (NRF).

A third aspect of the invention provides a network entity for supporting analytics generation, the network entity being configured to: obtain NSA information and/or UPA information from another network entity, in response to a first request sent to and/or according to a first subscription to the other network entity; wherein the NSA information indicates a relation between an AN property and a CN property, and the UPA information indicates a network entity configured to transmit data traffic to and/or from a user equipment in the network; and/or obtain NSA information and/or UPA information from another network entity, upon changes in one or more target elements related to the NSA information and/or UPA information. The one or more target elements are related to the other network entity.

The network entity of the third aspect supports the analytic generation by gathering and maintaining the NSA and/or UPA information. It can then provide the necessary association information for generating analytics information, for instance, to the network entity of the first aspect. In particular, the network entity of the third aspect supports pre-data collection for the analytics generation with both new information that was not previously available to analytics generation with significantly reduced load. The significantly reduced load can be particularly achieved when the network entity of the third aspect obtains association information upon changes in one or more target elements related to the NSA information and/or UPA information. This implicitly means that existing communications between the network entity of the third aspect and the other network entities can be enhanced, reused, piggybacked to include association information, therefore eliminating the need for extra signalling in the systems for the gathering of association information.

In an implementation form of the third aspect, the network entity is further configured to: obtain a second request and/or a second subscription, for NSA information and/or UPA information, from a further network entity; and provide the obtained NSA information and/or UPA information and/or aggregated NSA information and/or UPA information to the further network entity, in response to the second request and/or according to the second subscription.

Accordingly, the network entity of the third aspect can thus provide the NSA information and/or UPA information, which it collected from one or more other network entities (e.g., NFs) to the further network entity (e.g., the network entity of the first aspect). The network entity of the third aspect can thus act as intermediary network entity (e.g., intermediary NF, or determined NF) between the network entity of the first aspect and other network entities (e.g., other NFs).

In an implementation form of the third aspect, the network entity is further configured to: aggregate the obtained NSA information and/or UPA information, and/or store the obtained NSA information and/or UPA information.

Thus, the network entity generating the analytics information can perform the generation more efficiently and faster based on the already pre-processed NSA and/or UPA information.

In an implementation form of the third aspect, the network entity is a control plane entity, in particular comprising a Unified Data Management (UDM) and/or Unified Data Repository (UDR) and/or NWDAF.

A fourth aspect of the invention provides a network entity, in particular a management plane entity, for supporting analytics generation, the network entity being configured to: configure another network entity with NSA information and/or UPA information, wherein the other network entity is, in particular, a NWDAF, and/or a UDM and/or a UDR, and wherein the NSA information indicates a relation between an AN property and a CN property, and the UPA information indicates a network entity configured to transmit data traffic to and/or from a user equipment in the network.

The network entity of the fourth aspect supports the analytic generation by configuring the necessary association information at the responsible network entity. It can configured the necessary association information for generating analytics information, for instance, at the network entity of the first aspect. In particular, the network entity of the fourth aspect supports pre-data collection for the analytics generation with significantly reduced load. In particular for the case of network slice association information, where no control plane signalling is required for the network entity being configured, for instance the network entity of the first aspect, to obtain the NSA information.

In an implementation form of any of the first aspect to fourth aspect or any implementation form thereof, the NSA information comprises at least one of: a cell related to a TA, Access Type, and/or one or more allowed S-NSSAIs and/or allowed NSI(s) and/or one or more restricted S-NSSAIs and/or restricted NSI(s) and/or one or more NFs, one or more allowed S-NSSAI(s) and/or allowed NSI(s) per PLMN for each related NF; a cell related to a TA, Access Type, and/or one or more allowed S-NSSAIs and/or allowed NSI(s) and/or one or more restricted S-NSSAIs and/or restricted NSI(s) and/or one or more NFs, one or more restricted S-NSSAI(s) and/or restricted NSI(s) per PLMN for each related NF; a TA related to a list of Cells, a supported Access Type, and/or one or more allowed S-NSSAI(s) and/or allowed NSI(s), and/or one or more NFs, one or more allowed S-NSSAI(s) and/or allowed NSI(s) for each related NF; a TA related to a list of Cells, a supported Access Type, and/or one or more restricted S-NSSAI(s) and/or restricted NSI(s) per PLMN, and/or one or more NFs, one or more restricted S-NSSAI(s) and/or restricted NSI(s) per PLMN for each related NF; a NF related to a TA(s), for the TA, one or more related Cells, one or more related Access Types, one or more related allowed S-NSSAI(s) and/or allowed NSI(s); a NF related to a TA(s), for the TA, one or more related Cells, one or more related Access Types, one or more related restricted S-NSSAI(s) and/or restricted NSI(s) per PLMN.

In an implementation form of any of the first aspect to fourth aspect or any implementation form thereof, the network entity is further configured to, wherein the UPA information comprises at least one of: one or more user plane NFs transmitting Uplink, UL, and/or Downlink, DL, data traffic related to one or more User Equipments, UEs, and/or one or more groups of UEs, and/or one or more and/or UE session, and/or one or more data network identification (e.g., DNN or DNAI), and/or one or more network slice identification (e.g., S-NSSAI and/or NSI, and/or NSSAI), and/or one or more application identification (e.g., AF identifier); one or more control plane NFs transmitting UL and/or DL data traffic related to one or more UEs and/or one or more groups of UEs and/or one or more UE sessions, and/or one or more data network identification (e.g., DNN or DNAI), and/or one or more network slice identification (e.g., S-NSSAI and/or NSI, and/or NSSAI), and/or one or more application identification (e.g., AF identifier); one or more user plane interfaces, and/or links, and/or reference points, and/or services, transmitting UL and/or DL data traffic related to one or more UEs and/or one or more groups of UEs and/or one or more UE sessions, and/or one or more data network identification (e.g., DNN or DNAI), and/or one or more network slice identification (e.g., S-NSSAI and/or NSI, and/or NSSAI), and/or one or more application identification (e.g., AF identifier); one or more control plane interfaces, and/or links, and/or reference points, and/or services, transmitting UL and/or DL data traffic related to one or more UEs and/or one or more groups of UEs and/or one or more UE sessions, and/or one or more data network identification (e.g., DNN or DNAI), and/or one or more network slice identification (e.g., S-NSSAI and/or NSI, and/or NSSAI), and/or one or more application identification (e.g., AF identifier).

A fifth aspect of the invention provides a method for analytics generation, the method comprising: obtaining NSA information and/or UPA information from one or more network entities; wherein the NSA information indicates a relation between an AN property and a CN property, and the UPA information indicates a network entity configured to transmit data traffic to and/or from a user equipment in the network; and provide analytics information, the analytics information being based on the obtained NSA information and/or UPA information.

The method of the fifth aspect can have implementation forms that correspond to the implementation forms of the network entity of the first aspect. Accordingly, the method of the fifth aspect and its possible implementation forms achieve the same advantages and effects as the network entity of the first aspect and its respective implementation forms.

A sixth aspect of the invention provides a method for supporting analytics generation, wherein the method can be performed by a network entity, the method comprising: providing NSA information and/or UPA information to another network entity, in response to a request received from and/or according to a subscription from the other network entity; wherein the NSA information indicates a relation between an AN property and a CN property, and the UPA information indicates a network entity configured to transmit data traffic to and/or from a user equipment in the network and/or providing NSA information and/or UPA information to another network entity, upon changes in one or more target elements related to the NSA information and/or UPA information, wherein the one more target elements may be related to the network entity performing the method.

The method of the sixth aspect can have implementation forms that correspond to the implementation forms of the network entity of the second aspect. Accordingly, the method of the sixth aspect and its possible implementation forms achieve the same advantages and effects as the network entity of the second aspect and its respective implementation forms.

A seventh aspect of the invention provides a method for supporting analytics generation, the method comprising: obtaining NSA information and/or UPA information from another network entity, in response to a first request sent to and/or according to a first subscription to the other network entity; wherein the NSA information indicates a relation between an AN property and a CN property, and the UPA information indicates a network entity configured to transmit data traffic to and/or from a user equipment in the network, and/or obtaining NSA information and/or UPA information from another network entity, upon changes in one or more target elements related to the NSA information and/or UPA information.

The method of the seventh aspect can have implementation forms that correspond to the implementation forms of the network entity of the third aspect. Accordingly, the method of the seventh aspect and its possible implementation forms achieve the same advantages and effects as the network entity of the third aspect and its respective implementation forms.

An eighth aspect of the invention provides a method for supporting analytics generation, the method comprising: configuring a network entity with NSA information and/or UPA information, wherein the other network entity is, in particular, a NWDAF and/or a UDM and/or a UDR, and wherein the NSA information indicates a relation between an AN property and a CN property, and the UPA information indicates a network entity configured to transmit data traffic to and/or from a user equipment in the network.

The method of the eighth aspect can have implementation forms that correspond to the implementation forms of the network entity of the fourth aspect. Accordingly, the method of the eighth aspect and its possible implementation forms achieve the same advantages and effects as the network entity of the fourth aspect and its respective implementation forms.

A ninth aspect of the invention provides a computer program comprising a program code for performing the method according to the fifth, sixth, seventh or eighths aspect, when executed on a computer.

DEFINITIONS

In the following, some terms used in this document are generally defined.

Analytics Function: may be a NF that receives a request and/or subscription to analytics information from a consumer, and can perform analytics information generation. An example of an Analytics Function is the NWDAF (Network Data Analytics Function) of 3GPP 5G Architecture defined in TS 23.501. The Analytics function may be implemented by the network entity of the first aspect.

Analytics Information: is the output of an Analytics Functions, for instance an Analytics ID, as defined in 3GPP TS 23.288, such as the analytics IDs listed in Clauses 6.4-6.9 in TS 23.288 V16.1.0.

Analytics Information Generation: is a process, in which the Analytics Function may trigger raw data collection (if data is not available) and/or selects previously collected raw data (raw data being, for instance, throughput of a Cell, bitrate of PDU session ID in an UPF)) and use such raw data to perform calculations and/or applies statistical analysis, and/or applies ML/AI techniques (such as regression models, neural networks, etc.) to produce an output, i.e., generate the analytics information.

User Plane Association (UPA) information: defines the 5GS entities configured to transmit data traffic to and/or from UE(s) in the mobile network, i.e., UE communication. The UPA information can also be defined as a mapping among one or more CN properties (e.g., UE identification, NF instance identification, N3/N6/N9 interfaces identification, DNN identification, network slice identification, PDU session identification, type of UE traffic—i.e., UP based or CP) and the transmitted data traffic to and/or from UEs. Some examples of possible UE communications are listed below:

If the UE communication is defined as a session between a UE and DN, the 5GS entities and their properties in the user plane that are used for such UE communication may be: UE, Cell(s), N3(s), UPF(s), N9 if more than one UPF is used, N6(s), and DNN/DNAI, as described in the overall architecture of 3GPP TS 23.501.

If the UE communication is defined as Non-IP Data Delivery, then the 5GS entities that can be used for such UE communication may be: Cell, NEF, SMF, AF (as defined in 3GPP TS 23.501 and TS 23.502).

If the UE communication is, for instance, Vehicle-to-Anything (V2X), the user plane entities that are used for such UE communication could be: UE, Cell, Road Side Unit (RSU), UPF, etc.

The UPA information may comprise at least one of:

One or more "user plane NFs" transmitting UL and/or DL data traffic related to one or more UE(s) and/or groups of UE, and/or one or more UE session identification, and/or one or more data network identification (e.g., DNN or DNAI), and/or one or more network slice identification (e.g., S-NSSAI and/or NSI, and/or NSSAI), and/or one or more application identification (e.g., AF identifier).

One or more "core plane NFs" transmitting UL and/or DL data traffic related to one or more UE(s) and/or groups of UE, and/or one or more UE session identification, and/or one or more data network identification (e.g., DNN or DNAI), and/or one or more network slice identification (e.g., S-NSSAI and/or NSI, and/or NSSAI), and/or one or more application identification (e.g., AF identifier).

One or more "user plane interfaces and/or links and/or reference points and/or services" transmitting UL and/or DL data traffic related to one or more UE(s) and/or groups of UE, and/or one or more UE session identification, and/or one or more data network identification (e.g., DNN or DNAI), and/or one or more network slice identification (e.g., S-NSSAI and/or NSI, and/or NSSAI), and/or one or more application identification (e.g., AF identifier).

One or more "core plane interfaces and/or links and/or reference points and/or services" transmitting UL and/or DL data traffic related to one or more UE(s) and/or groups of UE, and/or one or more UE session identification, and/or one or more data network identification (e.g., DNN or DNAI), and/or one or more network slice identification (e.g., S-NSSAI and/or NSI, and/or NSSAI), and/or one or more application identification (e.g., AF identifier).

Network Slice Association (NSA) information: may define the mapping among an AN property (e.g., respectively, cells ID, tracking area/access type) and a CN property (e.g., respectively, NFs ID, Interfaces ID, allowed or restricted S-NSSAIs/NSIs) for a network slice (e.g., S-NS-SAI) and/or a NSI).

The NSA information may comprises at least one of:

"A cell related to a TA, Access Type, and/or one or more allowed S-NSSAIs and/or allowed NSI(s) and/or one or more restricted S-NSSAIs and/or restricted NSI(s) and/or one or more NFs, one or more allowed S-NSSAI(s) and/or allowed NSI(s) per PLMN for each related NF"

A cell related to a TA, Access Type, and/or one or more allowed S-NSSAIs and/or allowed NSI(s) and/or one or more restricted S-NSSAIs and/or restricted NSI(s) and/or one or more NFs, one or more restricted S-NSSAI(s) and/or restricted NSI(s) per PLMN for each related NF a TA related to a list of Cells, a supported Access Type, and/or one or more allowed S-NSSAI(s) and/or allowed NSI(s), and/or one or more NFs, one or more allowed S-NSSAI(s) and/or allowed NSI(s) for each related NF a TA related to a list of Cells, a supported Access Type, and/or one or more restricted S-NSSAI(s) and/or restricted NSI(s) per PLMN, and/or one or more NFs, one or more restricted S-NSSAI(s) and/or restricted NSI(s) per PLMN for each related NF a NF related to a TA(s), for the TA, one or more related Cells, one or more related Access Types, one or more related allowed S-NSSAI(s) and/or allowed NSI(s)

a NF related to a TA(s), for the TA, one or more related Cells, one or more related Access Types, one or more related restricted S-NSSAI(s) and/or restricted NSI(s) per PLMN Association information: is equivalent of using the term "NSA information and/or UPA information".

Target element related to UPA information: may be UEs and/or group of UEs, and/or PDU session, and/or, data network identification, and/or network slice identification.

Target element related to NAS information: may be TA(s) and/or Cell(s) identification, and/or Access Types and/or, network slice identification, a NF related to a TA(s), and/or network slice identification related to TA.

NF that detects, generates association information: may be an NF that has the ownership of the NSA information and/or UPA information. For instance, an NF that detects UPA information, is the one that can define the set of UPFs and UP interfaces that will be used for the establishment of UE sessions in the mobile network, such as SMF in 5GS. An example for a NF that generates NSA information is the AMF, which has the control of which cell is associated with which TA, and which network slices (i.e., S-NSSAI) and/or NSIs are allowed in a TA.

NF enhanced with association information: may be a NF that detects and/or generates association information and exposes such association information, i.e., provides ways to other network entities in the system to obtain such information. The association information exposed by such a NF may be an individual basis, for instance, the association information may be detected by a specific NF type and instance (or NF set) that qualifies the NF enhanced with association information (e.g., NF Type SMF, NF type AMF, NF Type SMF set A, etc.). This NF enhanced with association information may be implemented by the network entity of the second aspect.

NF enhanced with centralization of association information (i.e., the determined NF): may be a NF capable of obtaining (e.g., invoking services), e.g., from one or more NF enhanced with association information from the same NF Type and/or NF set, the association information, storing and/or aggregating (and storing) such association information, and being able to provide queries and/or search/and/or retrieval of the association information to other entities in the network. Examples of information that can be exposed by the NF enhanced with centralization of association information may be not in individual basis, i.e., for instance the association information that can be provided is related to different types of NFS and/or NF sets. This NF enhanced with centralization of association information may be implemented by the network entity of the third aspect.

It is possible that a same network entity can perform the role of a NF enhanced with association information as well as a NF enhanced with centralized association information. In this case, there would exist only one visible service between such NF with both roles and the Analytics Function. That is, the network entity of the second aspect may also be the network entity of the third aspect.

It is possible that an Analytics Function performs also the role of a NF enhanced with centralization of association information. In this case, the interactions between NF with enhanced association information and Analytics Function would be visible to 5GS. That is, the network entity of the first aspect may be the network entity of the third aspect.

Generating analytics information based on association information: The Analytics Function generating analytics information, may require data (i.e., raw data such throughput of a Cell). Nevertheless, the collection of raw data to be used for analytics generation may depend on the target of the analytics information. For instance, one analytics information should be provided for a group of UEs #1, or a set of NFs {a,b,c}. Therefore, before triggering the data collection or using the collected data, the Analytics Function may need, in a first moment, to determine which NF instances are serving a UE (which are the target of the analytics information), as well as AN and network slices and/or network slice instances (which are the target of the analytics information), and in a second step trigger the collection of data and/or use already collected data from the serving NFs and or Cells and/or network slices and/or network slices instances. The Analytics Function thus, may use the association information as filter to determine/select which entities to trigger the raw data collection and/or as filter to select subsets of already raw collected data.

Discovering of proper association information provider: The Analytics Function may acquire the information, such as address and/or ID, of the NF that can provide the association information. For instance, acquiring could be based on checking configurations that map UEs to NFs, or interacting with discovery repositories (such as NRF in 5GS) to acquire the address of the NF serving the UEs.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present invention will be explained in the following description of specific embodiments in relation to the enclosed drawings, in which

FIG. 11 shows in (a)-(c) different methods, according to embodiments of the invention, for supporting analytics generation.

DETAILED DESCRIPTION OF EMBODIMENTS

Figure 1:
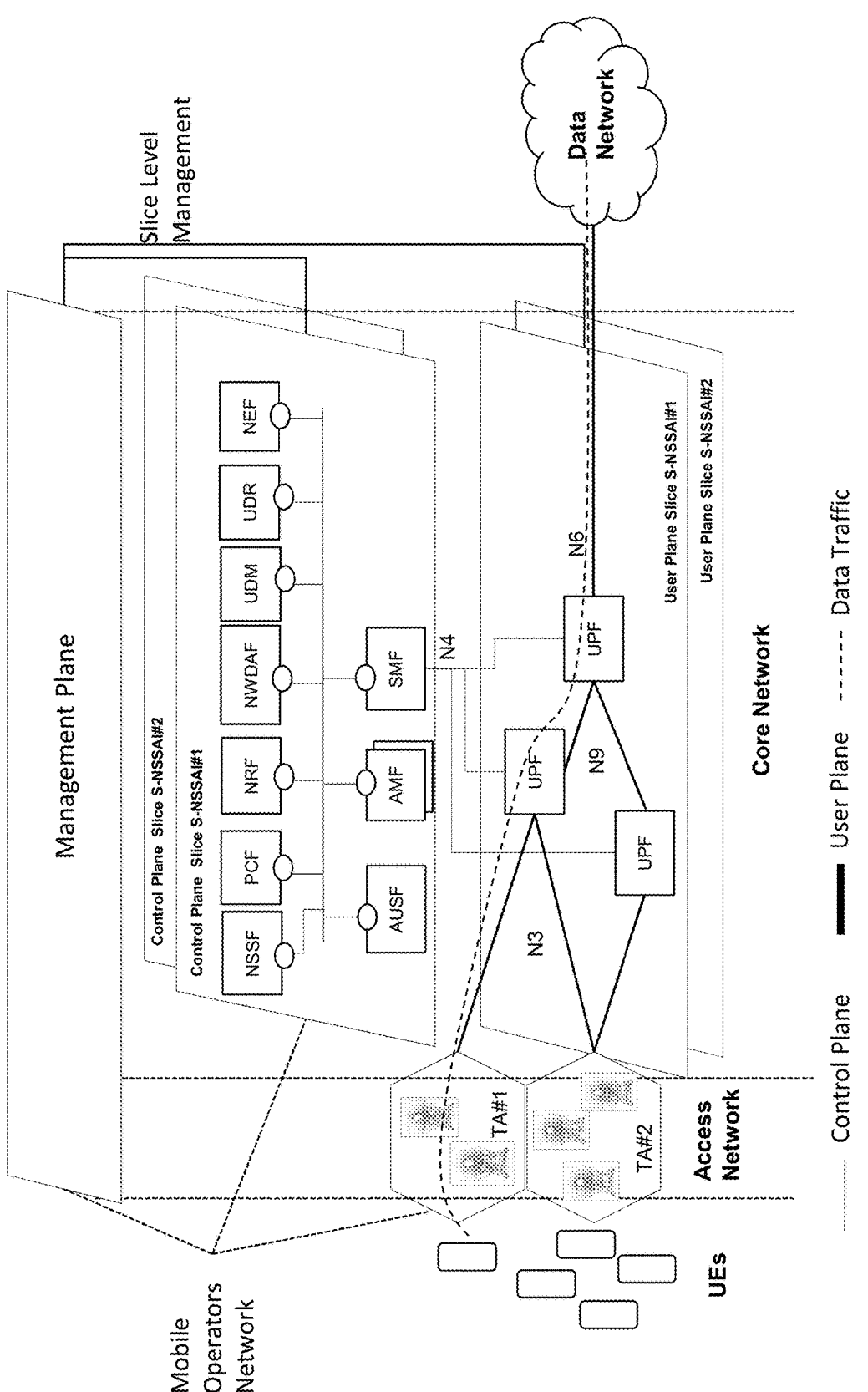
FIG. 1 shows an example of a mobile network following a 5G architecture as defined by 3GPP.
Figure 2:
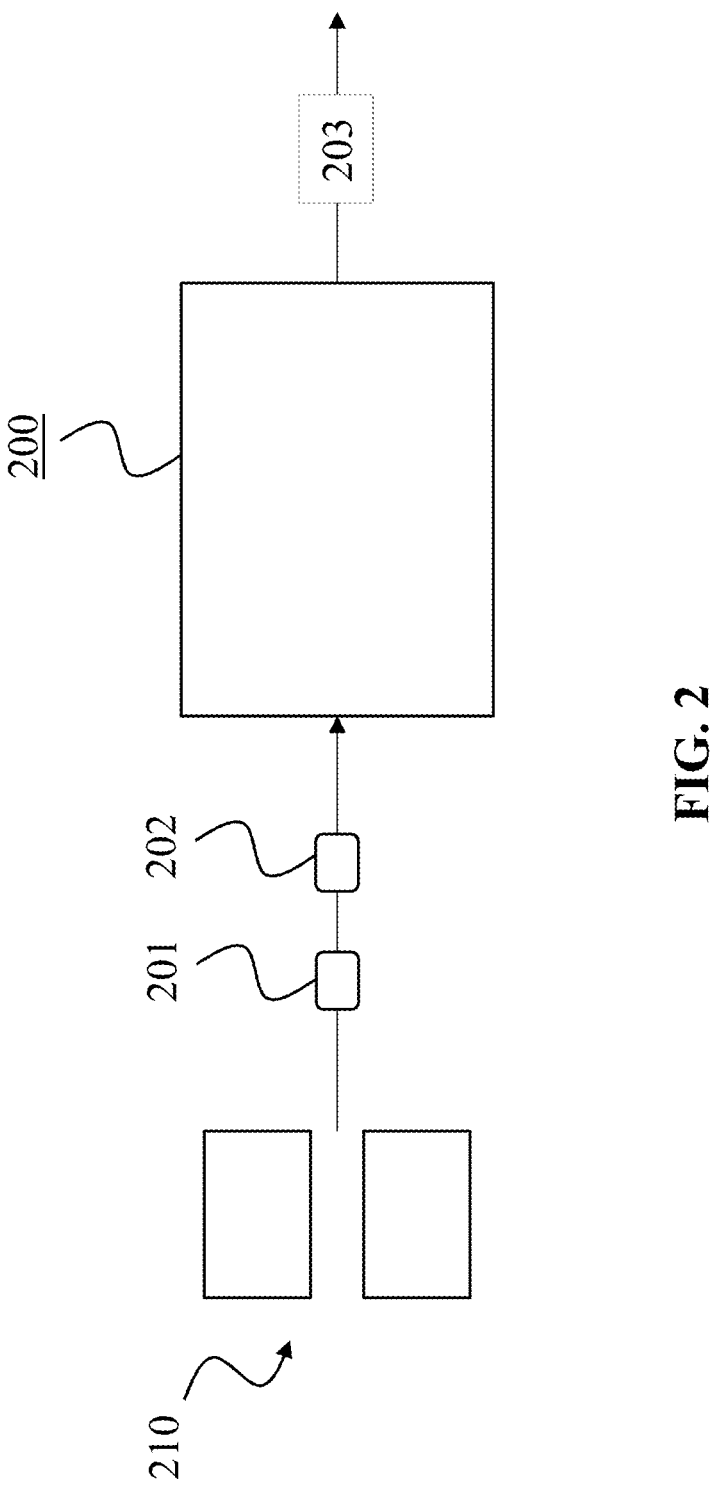
FIG. 2 shows a network entity for analytics generation, according to an embodiment of the invention.

FIG. 2 shows a network entity 200 according to an embodiment of the invention. The network entity 200 is configured to generate analytics. The network entity 200 may be a control plane entity, in particular, it may be or comprise a NWDAF. The network entity 200 may implement an Analytics Function.

The network entity 200 is configured to obtain NSA information 201 and/or UPA information 202 from one or more other network entities 210. The one or more other network entities may comprise a network entity 310 (see FIG. 3), which may be a control plane NF, in particular comprising a SMF and/or AMF and/or an NSSF and/or a NEF and/or an AF and/or a NRF. The one or more other network entities may also comprise a determined network entity 410 (see FIG. 4), which may be a control plane entity, in particular comprising a UDM and/or UDR and/or NWDAF. The one or more other network entities may also comprise a network entity 510 (see FIG. 5), which may be a management plane entity.

The network entity 200 is further configured to provide analytics information 203, wherein the analytics information 203 is based on the obtained NSA information 201 and/or UPA information 202. That is, it may generate the analytics information based on the association information 201/202. The network entity 200 may also expose and/or send the analytic information 203 and/or the association information 201/202 to another network entity.

Figure 3:
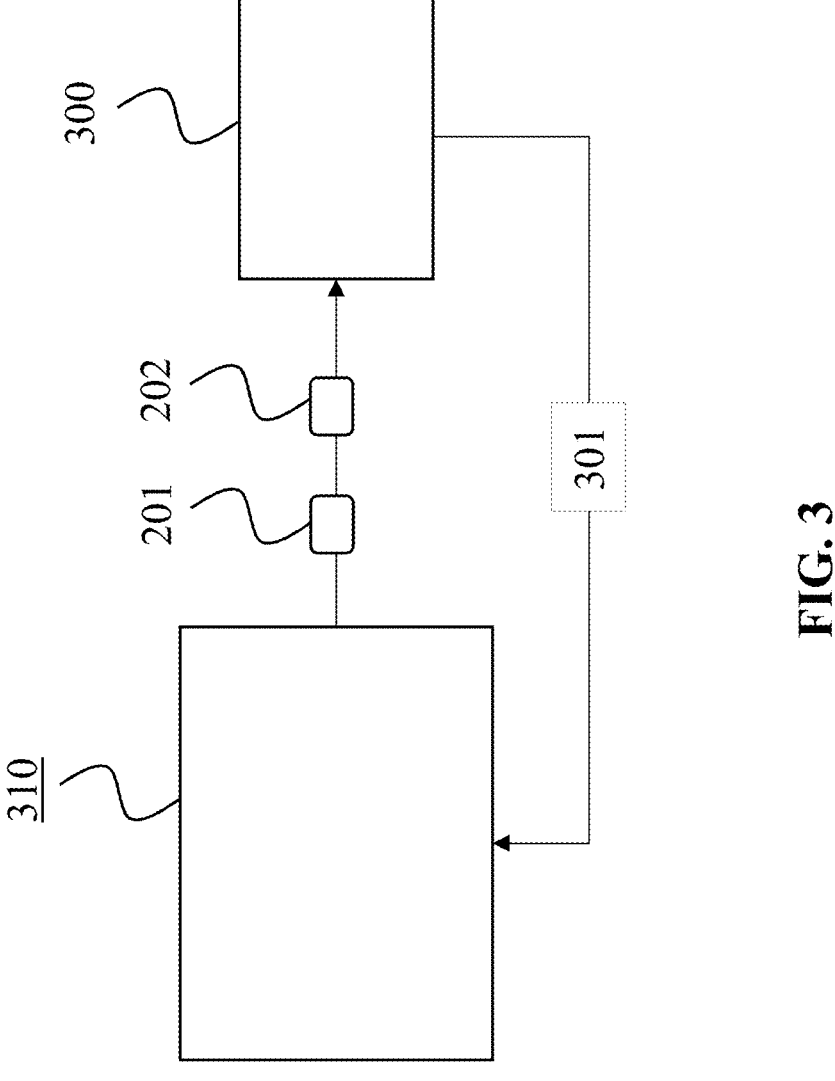
FIG. 3 shows a network entity for supporting analytics generation, according to an embodiment of the invention.

FIG. 3 shows a network entity 310 according to an embodiment of the invention. The network entity 310 is configured to support analytics generation, for instance, as performed by the network entity 200 of FIG. 2 and/or by a NWDAF. The network entity 310 may be a control plane NF, in particular comprising a SMF and/or AMF and/or an NSSF and/or a NEF and/or an AF and/or a NRF.

The network entity 310 is configured to provide NSA information 201 and/or UPA information 202 to another network entity 300, in response to a request 301 received from and/or according to a subscription from the other network entity 300. Alternatively, or in addition, the network entity 310 may be configured to provide NSA information 201 and/or UPA information 202 to another network entity 300, upon changes in one or more target elements related to the NSA information 201 and/or UPA information 202. The one or more target elements being related to the network entity 310.

The other network entity 300 may be the network entity 200 shown in FIG. 2, i.e., may be a network entity according to an embodiment of the invention. Accordingly, the other network entity 300 may be, or comprise, a NWDAF and/or may implement an Analytics Function.

Figure 4:
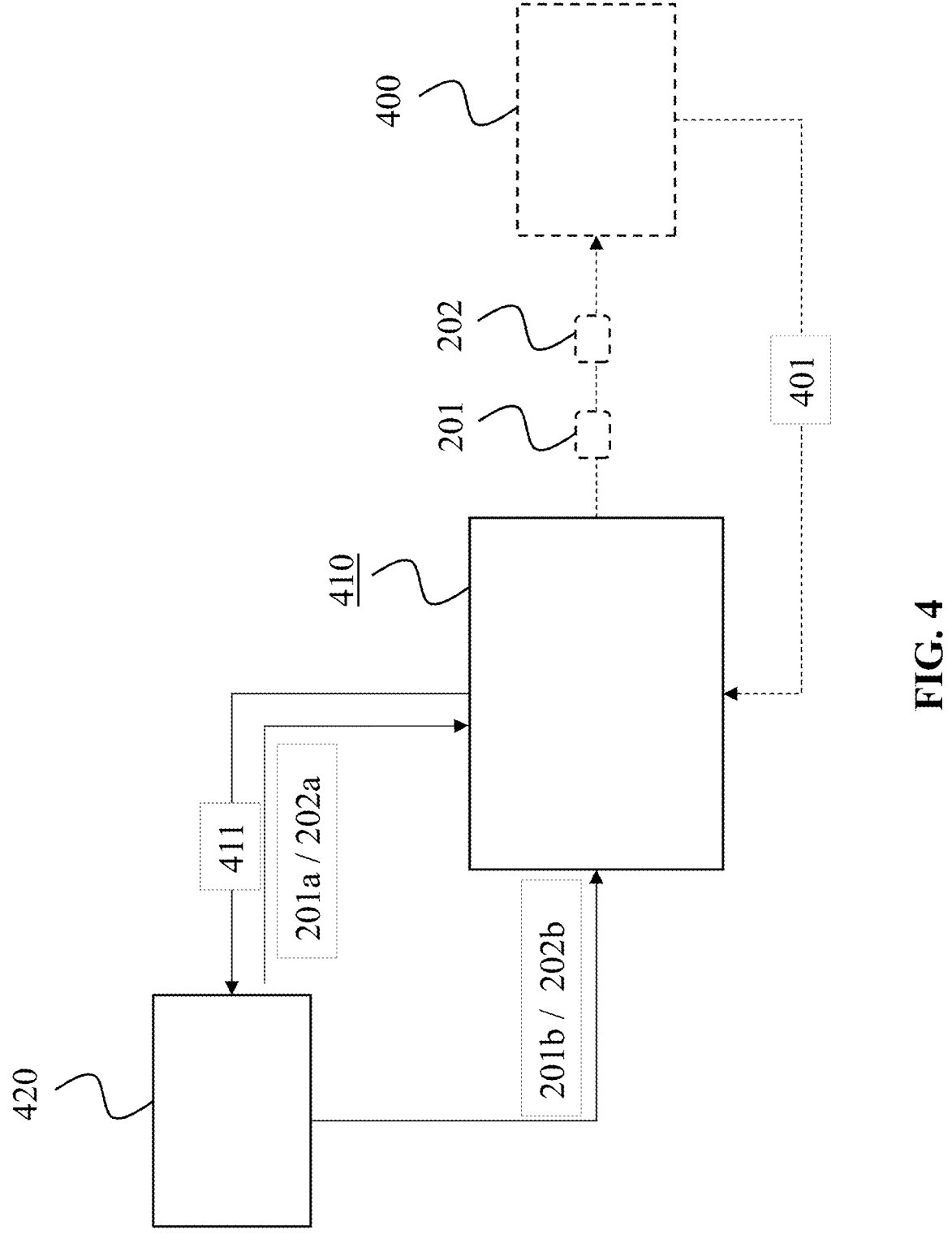
FIG. 4 shows a network entity for supporting analytics generation, according to an embodiment of the invention.

FIG. 4 shows a network entity 410 according to an embodiment of the invention. The network entity 410 is configured to support analytics generation, for instance, as performed by the network entity 200 of FIG. 2 and/or by a NWDAF. The network entity 410 may be a control plane entity, in particular comprising a UDM and/or UDR and/or NWDAF.

The network entity 410 is configured to obtain NSA information 201a and/or UPA information 202a from another network entity 420, in response to a first request 411 sent to and/or according to a first subscription to the other network entity 420. Alternatively, or in addition, the network entity 410 is configured to obtain NSA information 201b and/or UPA information 202b from another network entity 420, upon changes in one or more target elements related to the NSA information 201b and/or UPA information 202b. The one or more target elements being related to the other network entity 420.

The other network entity 420 may be may be a control plane NF, in particular comprising a SMF and/or AMF and/or an NSSF and/or a NEF and/or an AF and/or a NRF.

The network entity 410 may be further configured to (indicated in FIG. 4 as being optional by the dotted lines) to obtain a second request 401 and/or a second subscription, for NSA information 201 and/or UPA information 202, from a further network entity 400, and to provide the obtained NSA information 201a, 201b and/or UPA information 202a, 202b and/or aggregated NSA information 201a, 201b and/or UPA information 202a, 202b to the further network entity 400, in response to the second request 401 and/or according to the second subscription.

The further network entity 400 may be the network entity 200 shown in FIG. 2, i.e., it may be a network entity according to an embodiment of the invention. Accordingly, the further network entity 400 may be, or comprise, a NWDAF and/or may implement an Analytics Function.

Figure 5:
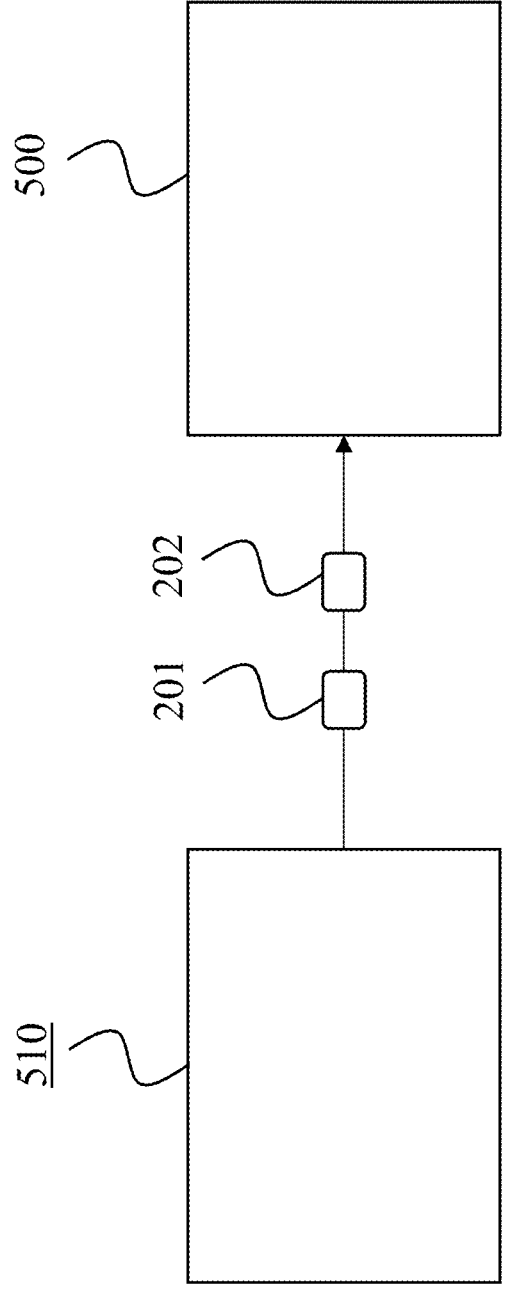
FIG. 5 shows a network entity for supporting analytics generation, according to an embodiment of the invention.

FIG. 5 shows a network entity 510 according to an embodiment of the invention. The network entity 510 is configured to support analytics generation, for instance, as performed by the network entity 200 of FIG. 2 and/or by a NWDAF. The network entity 510 may be a management plane entity, e.g. OAM.

The network entity 510 is configured to configure another network entity 500 with NSA information 201 and/or UPA information 202.

The other network entity 500 is, in particular, a NWDAF, and/or a UDM, and/or a UDR. The other network entity 500 may be the network entity 200 shown in FIG. 2, i.e., it may be a network entity according to an embodiment of the invention.

In particular, the network entity 200 of FIG. 2 may be an NWDAF and may obtain the NSA information 201 and/or the UPA information 202 from the network entity 310 being an SMF/AMF; and/or may obtain the NSA information 201 and/or UPA information 202 from the determined network entity 410 being an UDM/UDR; and/or may be configured by the network entity 510 being an OAM with the NSA information 201 and/or UPA information 202.

Each network entity shown in FIG. 2-FIG. 5 may comprise processing circuitry (not shown) configured to perform, conduct or initiate the various operations of the network entity described herein. The processing circuitry may comprise hardware and/or software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the network entity to perform, conduct or initiate the operations or methods described herein.

The main advantages of providing network entities as shown in FIG. 2-FIG. 5 are:

Enables the collection of the association information 201/202 for the generation of analytics information 203, such as the ones defined in TS 23.288 not only for UP data traffic for UE-DNN/DNAI communication, but allows also the determination of entities (CP and UP) serving UEs in other kind of UE data traffic communication (such as NIDD).

Reduces signaling generated by the network entity 200 responsible for the analytics generation (e.g. the NWDAF), for determining the mapping of Cells, TAs, NFs, S-NSSAIs, NSIs, because the network entity 200 does not need to consume information from different sources (e.g., different service operations even for the same NF) to identify the NSA information 201 and/or UPA information 202 for triggering the raw data collection for the analytics information 203 generation.

Clearly differentiates the role among the different network entities, e.g. the NWDAF, UDM, NRF, respectively, when it comes to managing the NSA information 201 and/or UPA information 202 between the UEs and network slice entities and internal network slice entities/configuration. The network entity 200 (e.g. the NWDAF) does not have to assume the same role as, e.g., the UDM on tracking the NFs serving the UEs, nor as the NRF role of tracking association of Network Slice entities.

Figure 6:
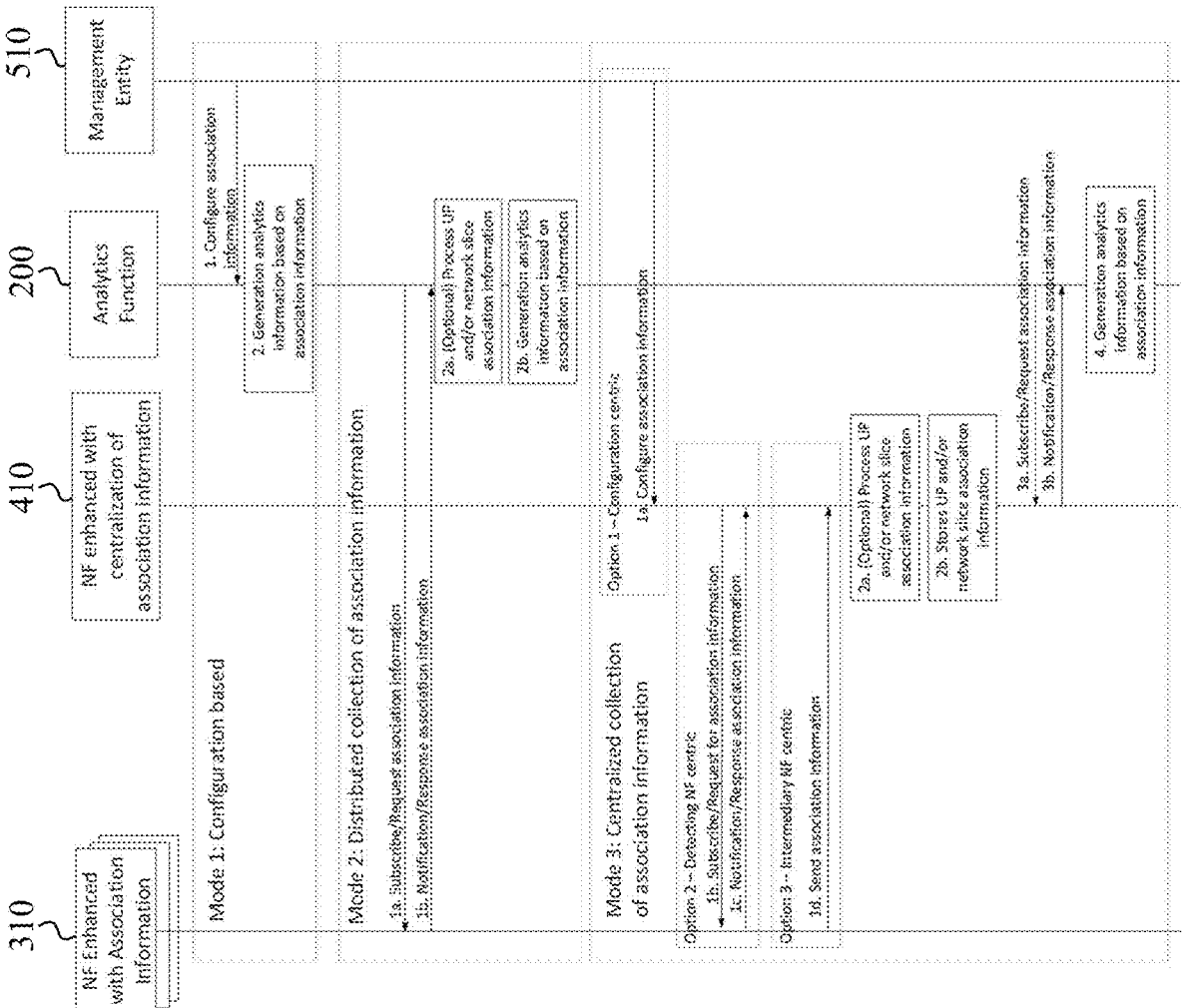
FIG. 6 shows various network entities, according to embodiments of the invention, implementing different operation modes 1-3.

FIG. 6 shows different operation modes that can be implemented based on the network entities described with respect to FIG. 2-FIG. 5. In particular, three operation modes 1, 2 and 3 are envisaged. Further, the network entity 200 of FIG. 2, the network entity 310 of FIG. 3, and the network entity 410 of FIG. 4 are considered in FIG. 6.

Operation Mode 1 (Configuration Based): In this operation mode 1, the network entity 200 (here Analytics Function; e.g. the NWDAF) is configured by a management (network) entity 510 (see FIG. 5) with the NSA information 201 and/or UPA information 202. Alternatives for performing the configuration are:

The management entity 510 may directly change the configuration of the NSA information 201 and/or UPA information stored in the Analytics Function 200. For instance, the management entity 510 may have the definition in a data structure of the Analytics Function 200, and this data structure may be enhanced with the association information 201/202. Therefore, when the Analytics Function 200 is deployed in the mobile network, the management entity 510 may configure (and update if changes happen) such data structure with the proper association information 201/202.

The Analytics Function 200 may provide a service and/or an interface so that the management entity 510 may invoke/access such service and/or interface, and may provide (e.g., by sending as input parameters of a service operation) the NSA information 201 and/or UPA information 202.

The steps in the operation mode 1 may be:

1. The management entity 510 configures the Analytics Function 200 with the NSA information 201 and/or UPA information 202.

2. The Analytics Function 200 generates the analytics information 203 based on the NSA information 201 and/or UPA information 202.

Operation Mode 2 (Distributed collection of association information): In this operation mode 2, the network entity 200 (here Analytics Function; e.g. the NWDAF) may directly consume the NSA information 201 and/or UPA information 202 from one or more NFs 310 enhanced with association information (see FIG. 3). The Analytics Function 200 may need to contact different types of NFs 310 (e.g., SMF, AMF, NSSF, etc.), in order to collect the NSA information 201 and/or UPA information 202. Different options, how the NFs 310 enhanced with association information may expose the NSA information 201 and/or UPA information 202, are discussed below.

The steps in operation mode 2 may be:

1. (a) The Analytics Function 200 may request and/or subscribe to the NFs 310 enhanced with association information for the NSA information 201 and/or UPA information 202. (b) The NFs 310 enhanced with association information may send, notify (eventually periodically) the requested the NSA information 201 and/or UPA information 202.

Examples of alternatives of how the Analytics Function 200 can consume (i.e., obtain) the association information 201/202 from the NF 310 enhanced with association information are listed below:

Following the Network exposure model defined in 3GPP TS 23.501: where a NF 310 enhanced with association information has its list of exposed events extended to include events for association; as well as, if required, extensions to the appropriate service operations to allow other entities to consume such service and therefore the UP and/or network slice association events.

Providing new dedicated service operations to allow consumers to request and/or subscribe to the association information 201/202 the NF 310 provides.

2. (a) Optionally, the Analytics Function 200 can perform some processing (e.g., aggregation) of the NSA information 201 and/or UPA information 202 obtained from different NFs 310 enhanced with association information, before storing and/or using such association information 201/202. (b) The Analytics Function 200 may generate the analytics information 203 based on the aggregated and/or obtained NSA information 201 and/or UPA information 202.

Operation Mode 3 (Centralized collection of association information): In this operation mode 3, the network entity 200 (here Analytics Function; e.g. the NWDAF) may consume the NSA information 201 and/or UPA information 202 from a NF 410 enhanced with centralization of association information (e.g., the determined NF) (see FIG. 4).

The steps in operation mode 3 may be:

1. In this step, there exist an intermediary NF 410 enhanced with centralization of association information (e.g., the determined NF), which obtains the NSA information 201 and/or UPA information 202. Different options can be applied for this, such as the ones below:

1a. (Option 1: Configuration centric): The management entity 510 may configure the NF 410 enhanced with centralization of association information. The same alternatives for performing the configuration described in operation mode 1 apply in this case, but now instead of the Analytics Functions 200, the configured entity is the NF 410 enhanced with centralization of association information.

1b-c. (Option 2: Detecting NF centric): The intermediary NF 410 enhanced with centralization of association information may request and/or subscribe to the NF 310 enhanced with association information (see FIG. 3) for the NSA information 201 and/or UPA information 202, and may receive the requested association information 201a/202a (eventually periodically in the case of subscription/notify). The same alternatives discussed in operation mode 2 for consuming/obtaining association information 201a/202a from the NF 310 may apply in this case.

1d. (Option 3: Intermediary NF centric): The NF 310 enhanced with association information may provide the NSA information 201b and/or UPA information 202b to the intermediary NF 410 enhanced with centralization of association information upon changes in target elements of association information, the one or more target elements being related to the NF 310 enhanced with association information. For instance, one possible alternative for the NF 310 enhanced with association to provide such information is by using interfaces and/or service operations from the intermediary NF 410 enhanced with centralization of association information. An example of changes in UPA information 202 is the session of an UE (e.g., the one target element of UPA information) is rerouted to a different UPF, and this means that the UP association information related to such target element changed. An example of a change in the NSA information 201 is the inclusion of a new Cell in a TA of an S-NSSAI, this means that the target element (e.g., the TA) of the network slice association information has changed.

2. (a) Optionally, the intermediary NF 410 enhanced with centralization of association information can perform some processing (e.g., aggregation) of the association information 201a/201b/202a/202b obtained from the different NFs 310 enhanced with association information, before storing and/or using such association information. (b) The intermediary NF 410 enhanced with centralization of association information can also stores the obtained and/or aggregated NSA information 201 and/or UPA information 202.

3. (a-b) The Analytics Function 200 may request and/or subscribe and/or search for association information 201/202 from the intermediary NF 410 enhanced with centralization, and may receive the required associated information 201/202.

4. The Analytics Function 200 may generate the analytics information 203 based on association information 201/202.

The following details are common to all operation modes 1-3:

Possible examples of processing (e.g., aggregation) that can be executed over the association information 201/202, for instance, either by the Analytics Function 200 and/or by the intermediary NF 410 enhanced with centralization of association information, are:

When the association information 201/202 obtained by the network entity (i.e., Analytics Function 200 and/or intermediary NF 410 enhanced with centralization of association information) is provided by a another entity (e.g., NF 310 enhanced with association information) that has a dedicated service and/or provides a specific data structure that organize the association information (i.e., NSA and/or UPA information 201/202), then the aggregation may just include adding, concatenating, grouping the obtained association information 201/202 according with the dataset key (e.g., database key for a dataset) used by the network entity to organize the association information 201/202. Examples of dataset key are: S-NSSAI and/or TA for NSA information, while for UPA an example is the UE identification (such as SUPI).

When the association information 201/202 obtained by the network entity (i.e., Analytics Function 200 and/or intermediary NF 410 enhanced with centralization of association information) is provided by another entity (e.g., NF 310 enhanced with association information) that does not have a dedicated service to provide the association information 201/202 and/or a data structure that directly reflects the association information 201/202 (i.e., the parameters of the service operation are not a direct mapping to the fields of the data structure of the association information), the association information 201/202 can be mixed with other type of information (e.g., UE context managed for instance by AMF and/or SMF network functions in 5GS, wherein inside the UE context it is possible to extract some NSA information such as Cell ID×TA×Access Technology from the overall data structure of UE context). In this case, when the network entity 200/410 may obtain the information from the other entity 310, the network entity 200/410 may first need to process such received information, and extract the association information 201/202 from the overall received information. Thus, the aggregation executed by the network entity 200/410 may comprise a sequence of processing steps. Examples of such processing steps are: the network entity 200/410 recognizes that parts of the received information are the association information 201/202; based on the recognized parts, the network entity 200/410 may extract the association information 201/202; based on the extracted association information 201/202, the network entity 200/410 may identify the dataset key related to the extracted association information 201/202; based on the identified dataset key, the network entity 200/410 may be able to add, concatenate, group the obtained association information 201/202 from another entity, the network entity 200/410 may store such concatenated, grouped association information 201/202.

One issue that can further be considered by the Analytics Function 200 is how the Analytic Function 200 actually executes the generation (and/or update) of analytics information 203 based on the association information 201/202. There are different possibilities to execute such generation (and/or update) of analytics information 203 based on the association information 201/202, which apply to all the operation modes 1-3. For instance, one or more of the following alternatives could be used by Analytics Function 200:

The Analytics Function 200 can be configured to trigger and/or execute updates on the generation of analytics information 203, whenever a new and/or a change in the obtained association information 201/202 happens.

The Analytics Function 200 can be configured to trigger and/or execute updates in the analytics generation periodically. Therefore, all changes to the association information 201/202 obtained by the Analytics Function 200 will be queued to be used only when the cycle of new generation (and/or update) of analytics is due.

The Analytics Function 200 can be configured with a queue that stores the changes in the association information 201/202 over a period of time, either when the queue is full and/or the period of time is approaching, the Analytics Function 200 triggers and/or executes the generation and/or update of the analytics information 203.

The Analytics Function 200 can be configured with different levels of urgency for triggering generation and/or update of analytics information 203 based on association information 201/202. For instance, changes in specific association information 201/202 may immediately trigger and/or execute the generation and/or update of analytics information 203 based on the changed association information 201/202, while regarding other association information 201/202 the Analytics Function 200 can work using the queue scheme described before.

The Analytics Function 200 can trigger and/or perform the generation of analytics information 203 based on the association information 201/202 when the Analytics Function 200 receives a request and/or subscription to an analytics information 203 (e.g., Analytics ID as defined in TS 23.288) that requires the Analytics Function 200 to identify which are the 5GS entities and their properties (i.e., network slice association information and/or the user plane association information) to determine the entities to collect and/or use the data for analytics calculation (i.e., generation).

It is also possible that the Analytics Function 200 uses a combination of any two of the operation modes 1-3 to obtain the association information 201/202. For instance:

The Analytics Function 200 may use operation mode 3 for obtaining the UPA information 202 and use operation mode 1 for obtaining the NSA information 201; or The Analytics Function 200 may use operation mode 3 for obtaining the UPA information 202 and use operation mode 2 for obtaining the NSA information 201.

In the following, more specific embodiments for the network entities according to embodiments of the invention (see FIG. 2-FIG. 5) are described based on a 5G mobile network following the architecture defined in 3GPP TS 23.501. Different alternatives of embodiments are possible, even within the 5GS.

The table below gives an overview of possible mappings among network entities according to embodiments of this invention, and how they could be realized by 5G entities. The table is not exhaustive, and further combinations of extensions in 5GS entities are possible.

| Network Entity | Applicable Operation Modes | Mapping to 5GS Entity | Possible extensions of 5GS Entity |
|---|---|---|---|
| Network Entity 200 (FIG. 2) | All | NWDAF | Request and receive the association information<br>Generate analytics using the association information, determine the association information, e.g., UP NFs, TAs, Cells, network slices - of the raw data (collected or to be triggered to be collected) to be used for generating the analytics information. |
| Network Entity 310 (FIG. 3) | 2 and 3 | SMF for exposing UPA information | Extension of list of events exposed by SMF e.g. via Nsmf_EventExposure (Operation Mode 2; and Option 2 of Operation Mode 3) |
| | | SMF for exposing UPA information in UE context registration | Extension of the UE Context information that SMF registers in UDM e.g. via Nudm_UECM_Registration to include in the UPA information (Option 3 of Operation Mode 3) |
| | | AMF for NSA information | Extension of list of events exposed by AMF via e.g. Namf_EventExposure (Operation Mode 2; and Option 2 of Operation Mode 3) |
| | | AMF for exposing NSA information in UE context registration | Extension of the UE Context information that AMF registers at UDM via e.g. Nudm_UECM_Registration to include in the NSA information (Option 3 of Operation Mode 3) |
| | | NSSF for NSA information | New event exposure service to be defined for NSSF to expose the network slice association information (Operation Mode 2; and Option 2 of Operation Mode 3) |

-continued

| Network Entity | Applicable Operation Modes | Mapping to 5GS Entity | Possible extensions of 5GS Entity |
|---|---|---|---|
| Network Entity 410 (FIG. 4) | 3 | UDM | Extension of the UE Context information that SMF/AMF registers in UDM via e.g. Nudm_UECM_Registration to include in the association information Extension of e.g. Nudm_UECM_Get to include the association information Extension of UDM e.g. Nudm_EventExposure services to include events about association information. Definition of a new service in UDM allowing the exposure of association information to consumers of such service Create a new UDM type of data (extending tables in Clause 5.2.3 in TS 23.502) related to association information to enable consumers to directly collect such data without having to request data using UE Context related services. |
| | | UDR | Create a new UDM type of data (extending tables in Clause 5.2.3 in TS 23.502) related to association information to enable consumers of UDR to store the information and to query such data without having to request data using UEs as the dataset key. |

From the possible implementations listed in the above table, the following are selected for description in detail:

Embodiment 1—operation mode 1 with the following entities involved: network entity 510 of FIG. 5 (management plane entity; e.g. OAM), and network entity 200 of FIG. 2 (Analytics Function; e.g. NWDAF).

Embodiment 2—operation mode 2 with the following entities involved: network entity 310 of FIG. 3 (NFs enhanced with association information; e.g. SMF, AMF) and network entity 200 of FIG. 2 (analytics function; e.g. NWDAF).

SMF and AMF considering the extensions on the Event Exposure; and one variant with NSSF exposing the network slice association information instead of AMF.

NWDAF directly subscribing to the events exposed by SMF, AMF.

Embodiment 3—operation mode 3 with the following entities involved: determined network entity 410 of FIG. 4 (NF enhanced with centralization of association information) and network entity 200 of FIG. 2 (Analytics function; e.g. NWDAF).

SMF exposes the UP association information with enhanced UDM UE Context registration.

NSSF is enhanced with a new service for event exposure to provide the NSA information 201.

UDM is enhanced with extended UE Context registration, new data type to reflect the association information 201/202; and a new service to expose association information 201/202.

NWDAF 200 consuming the new service from UDM to determine association information 201/202.

Figure 7:
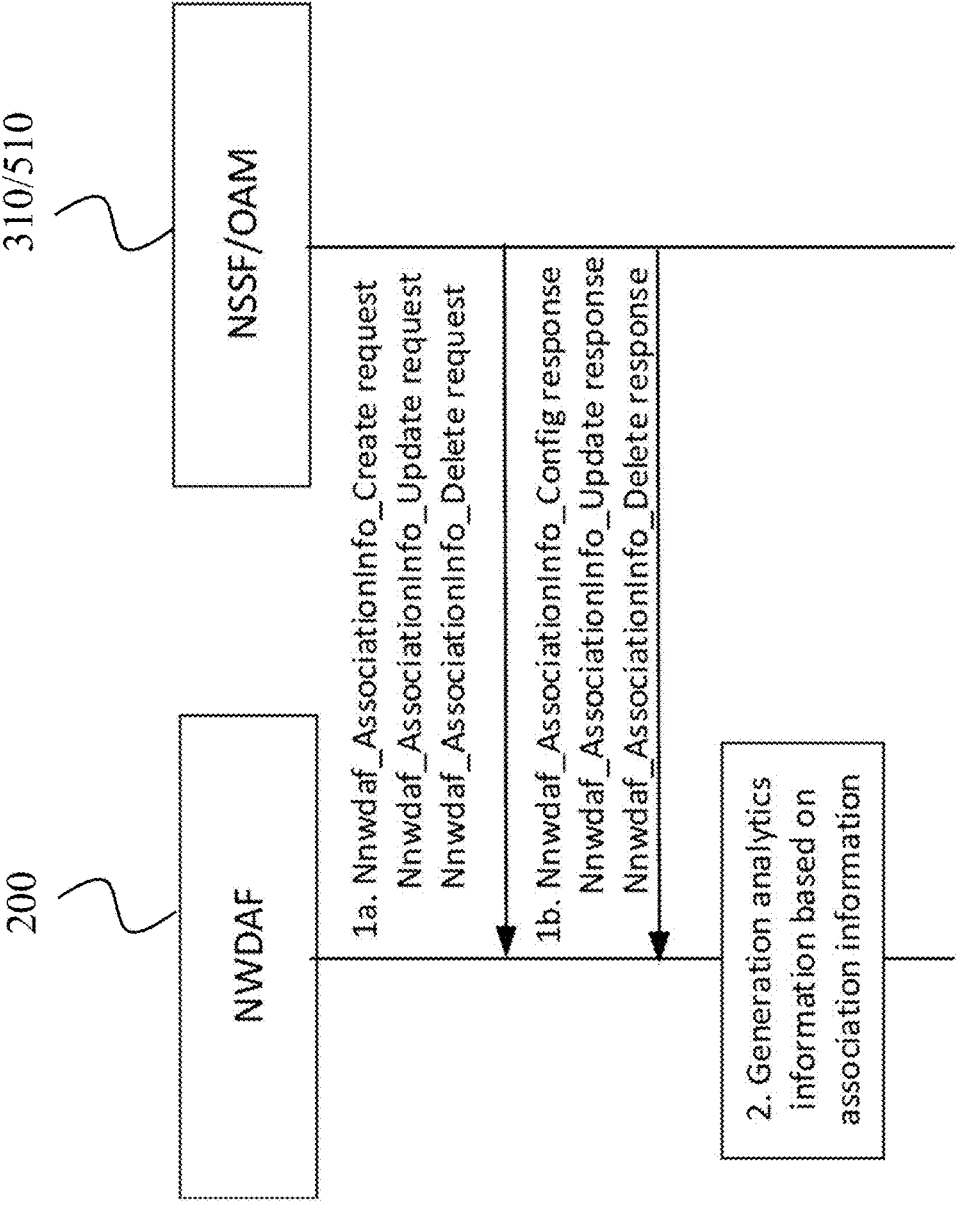
FIG. 7 shows an example embodiment of operation mode 1.

FIG. 7 illustrates the embodiment 1 of operation mode 1, and is based on OAM invoking NWDAF services to configure association information In this embodiment 1, the network entity 200 is exemplarily the NWDAF, which is extended with a new service called Nnwdaf_AssociationInfo that allows other entities, such as a management entity 510 (here exemplarily OAM) or a network entity 310 (here exemplarily the NSSF), to provide the association information 201/202. The new service can expose the following operations:

Create: may allow the creation of association information 201/202 at the NWDAF 200. The input parameters of this operation may include the fields of the association information 201/202 to be stored at the NWDAF 200, and the output of this operation may be an identifier to the stored association information 201/202.

Update: may allow a consumer of this service operation to change the content of a stored association information 201/202. The input parameters may be the identifier of the stored association information 201/202, and the association information 201/202 with the modified fields and or values.

Delete: may allow a consumer of this service operation to delete the content of a stored association information 201/202. The input parameters may be the identifier of the stored association information 201/202 to be removed.

In FIG. 7, the following steps are shown:

1a. The NSSF 310 or OAM 510 invokes the Nnwdaf_AssociationInfo service operation from the NWDAF 200 with the appropriate parameters.

1b. The NWDAF 200 processes the received information from the NSSF 310 or OAM 510.

2. The NWDAF 200 generates analytics information 203 based on the received association information 201/202. Based on the vendor strategy, the NWDAF 200 may trigger the generation and/or update of analytics information 203 based on the received association information 201/202. For instance, the NWDAF 200 can use a queue system to trigger the analytics generation and/or update based on the received association information 201/202.

Figure 8:
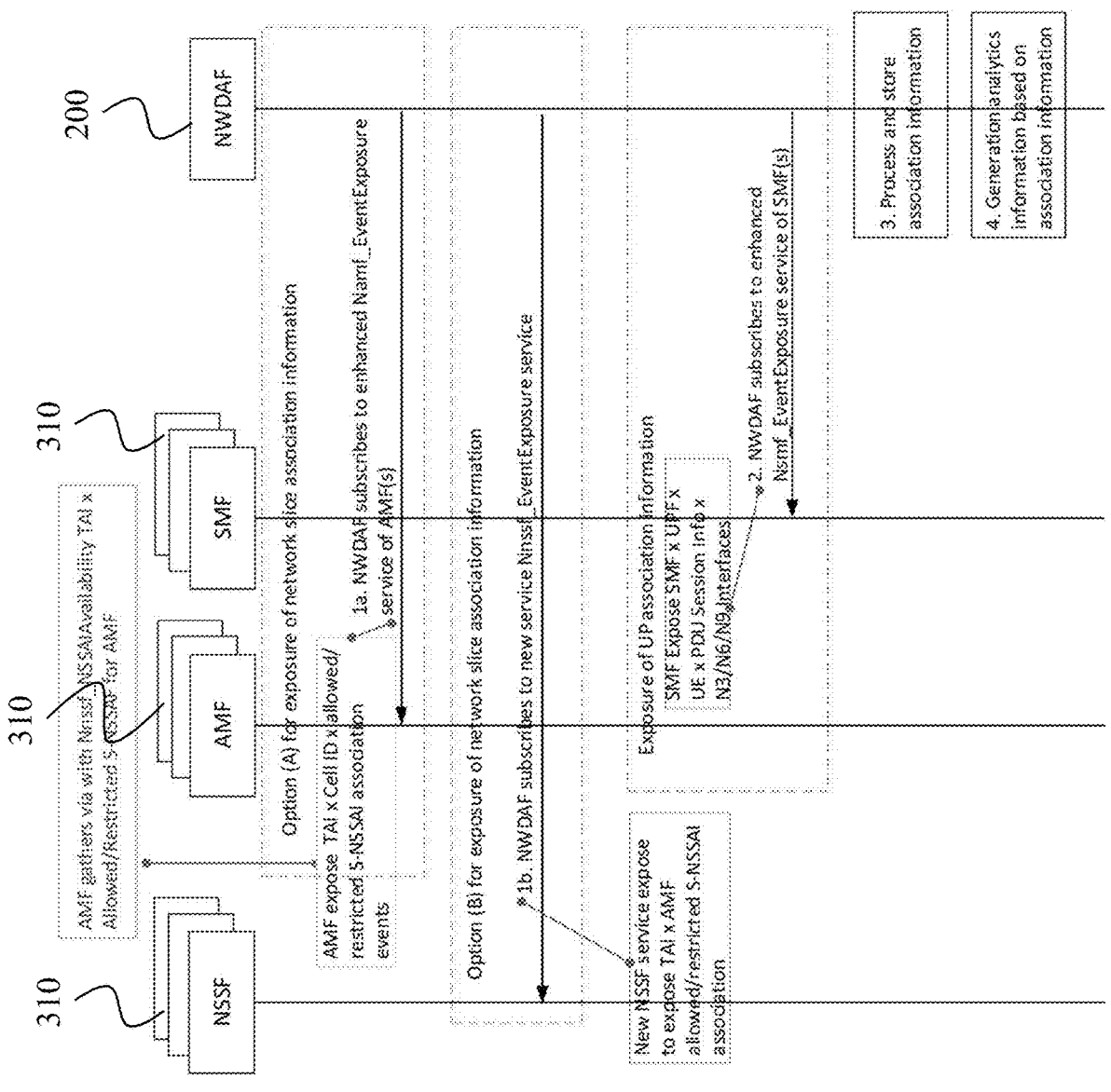
FIG. 8 shows an example embodiment of operation mode 2.

FIG. 8 illustrates the embodiment 2 of operation mode 2, and is based on the NWDAF using Extensions to Existing Event Exposure Services. In this embodiment 2, the proposed entities and concepts are mapped as follows:

The network entity 200 is exemplarily the NWDAF for implementing the Analytics Function.

The NSSF, AMF and SMF are exemplarily network entities 310 implementing NFs enhanced with association information.

The AMF is the NF 310 enhanced with association information that detects the NSA information 201, which comprises at least one of:

List of TA(s), for each TA, list of Cells identification with their related Access Types (e.g., eNB, or 5G NR, or non-3GPP, etc.), list of allowed S-NSSAI(s) and/or list of allowed NSI(s) that the AMF instance can support List of TA(s), for each TA, list of Cells identification with their related Access Types, list of restricted S-NSSAI(s) and/or restricted NSI(s) per PLMN for such AMF instance.

The NSSF is the NF 310 enhanced with association information that detects the NSA information 201, which comprises at least one of:

A list of TA(s), for each TA a list of Cells identification with their associated Access Type, list of allowed S-NSSAI(s) and/or list of allowed NSI(s)

A list of TA, for each TA a list of Cells identification with their Access Type, list of restricted S-NSSAI(s) and/or restricted NSI(s) per PLMN The SMF is the NF 310 enhanced with association information that detect the UPA information 202, which comprises:

List of UEs (e.g., identified by SUPI), for each UE a list of the UE PDU sessions identification (UL and/or DL), for each UE PDU session identification a list of UPFs and their N3 and N9 interfaces, or.

List of UEs (e.g., identified by SUPI), for each UE a list of UPFs transmitting the UE data traffic, for each UPF the list of N3 and/or N9 and/or N6 interfaces, or List of UEs (e.g., identified by User identity), for each UE list of NEF ID transmitting UL and/or DL for such UE.

In FIG. 8, the following steps are shown:

1. The NWDAF 200 may obtain the NSA information 201 according to different possible alternatives. Step 1a is related to the first alternative, where the NSA information 201 is obtained via interaction with AMF 310, while step 1b is related to the second alternative where the NSA information 201 is obtained from the NSSF 310.

1a. (Option 1) The NWDAF 200 may invoke the Namf_EventExposure_Subscribe request method from the AMF 310, and subscribe to receive a new type of event exposed by the AMF 310 called NSA event. In the subscription, the NWDAF 200 may indicate if the NSA information 201 is focused on a specific TA or to any TA supported by the AMF instance. The new NSA event contains the information about the requested TA and/or list of TA(s) by the NWDAF 200, for each TA, list of Cells identification with their related Access Types (e.g., eNB, or 5G NR, or non-3GPP, etc.), list of allowed S-NSSAI(s) and/or list of allowed NSI(s) that the AMF 310 instance can support. If any changes in the information related to the TA for such AMF 310 changes (e.g., a certain S-NSSAI becomes restricted to the AMF), the AMF 310 should notify the NWDAF 200 with the updated NSA.

The AMF 310 may be capable of storing and maintaining the NSA event due to its interaction with the NSSF 310 via the Nnssf_NSSAIAvailability service to acquire the mapping between TAs and allowed x restricted S-NSSAIs and/or NSIs that it (the AMF 310) can handle, and the AMF 310 may combine such information from the NSSF 310 with the its own configured information about the mapping of cells related to TAs. Combining these 2 information, the AMF 310 may be able to provide the NSA event to the NWDAF 200.

1b. (Option 2) The NWDAF 200 may invoke a new defined Nnssf_EventExposure_Subscribe request method from the NSSF 310 and subscribe to receive a new type of event exposed by the SMF 310 called NSA event. In the subscription, the NWDAF 200 indicates if the NSA information 201 related to the NSA Event (i.e., the Event Filter Information for the NSA event) is focused on specific TA(s) or any TA supported, a list of AMFs 310 or any AMF 310; a list of cells or any cell, a list of S-NSSAIs and/or NSIs or any S-NSSAIs and/or NSIs. The new NSA event may contains the information about the requested TA and/or list of TA(s) by NWDAF, for each TA, list of Cells identification with their related Access Types (e.g., eNB, or 5G NR, or non-3GPP, etc.), list of allowed S-NSSAI(s) and/or list of allowed NSI(s) that the AMF 310 instance can support. If any changes in the information related to NSA event requested changes (e.g., a certain S-NSSAI becomes restricted to a certain AMF), the NSSF 310 should notify the NWDAF 200 with the updated NSA.

The NSSF 310 may be capable of storing and maintaining the NSA event due to its interaction with the AMF 310 via the Nnssf_NSSAIAvailability service to acquire the mapping between TAs and cells related to an AMF instance (i.e., that can be handled/served by an AMF instance). The NSSF 310 may combine such information obtained from the AMF 310 with its own configured information about the mapping of TA(s) related to restricted and/or allowed S-NSSAIs and/or NSIs. Combining these 2 information, the NSSF 310 may be able to provide the NSA event to the NWDAF 200.

2. The NWDAF may obtain the UPA information 200 according to different alternatives. The NWDAF 200 may invoke the Nsmf_EventExposure_Subscribe request method from SMF 310 and subscribe to receive a new type of event exposed by SMF called UPA event. The UPA event may have two parts: the event filter information, which defines the parameter types and values related to a required UPA information to be compared against the actual UPA information; and the event output data, which is the actual UPA information 200 to be provided by the SMF 310 based on the requested UPA event with indicated event filter information.

In the subscription, the NWDAF 200 may indicate the event filter information that defines the focus of the UPA information 202 to be provided in the UPA event to NWDAF 200 by SMF 310. The event filter information of the request UPA event contains the information about the requested UE, and/or any UE, and/or list of UEs, and/or group of UEs, and/or DNN and/or DNAI information (that allows SMF to determine which N6 interfaces are relevant for the UPA Event, and therefore N3, N9, and UPF instances), and/or S-NSSAI(s) and/or NSI(s).

The SMF 310 may provide to NWDAF 200 the UPA information 202 matching the requested Event Filter information. If any change happens in the mapping of the CN properties associated with the transmitted data traffic to and/or from UEs (e.g., the target elements of UPA information); SMF 310 will trigger the notification of the changed value to NWDAF 200. For instance, if a modification of a PDU session (as defined in Clause 4.3.3 in 3GPP TS 23.502) related to a UE and/or DNN and/or S-NSSAI (e.g., the target elements of UPA information) included in the Event Filter Information of the NWDAF 200 subscription to UPA event at SMF 310, then SMF 310 will provide to NWDAF 200 an update in the subscribed UPA event, containing the changes in the UPA information 202. For instance, if a new UPF NF instances has been selected for transmitting the data traffic of a UE (included in the event filter information), SMF will update the UPA information 202 mapping the new UPF NF instance ID as another CN property related to the data traffic of such UE, and provide to NWDAF 200, via notification, the update UPA information 202.

3. The NWDAF 200, upon receiving the association information 201/202 may update its internal data structures data keep such association information 201/202. In the case of this embodiment, the obtained information is a data structured already organized as the NSA 201 and/or UPA information 201, therefore the processing (e.g., aggregation) in this case is just to store the received information according with the index used for NSA and/or UP information 201/202. For instance, NWDAF 200 can have a data structure for NSA information 201 indexed per TA, where for each TA NWDAF maintains a list of cell IDs, allowed S-NS-SAIs and/or NSIs, list of restricted S-NSSAIs and/or NSIs; and further for each allowed and/or restricted S-NSSAI and/or NSI, NWDAF keeps a list of related AMFs.

4. Based on the obtained association information, NWDAF 200 generates analytics information 203. The actual process of analytics generation involves NWDAF 200 triggering data collection (if data is not available) of raw data (e.g., throughput of a Cell, bitrate of PDU session ID in an UPF)) and/or use of such data and/or previously collected raw data to perform calculations and/or applies statistical analysis, and/or applies ML/AI techniques (such as regression models, neural networks, etc.) to produce an analytics information 203.

In order to trigger raw data collection from sources of data collection and/or use available collected raw data from sources of data collection, NWDAF 200 has to determine the association information 201/202 that matches the requested analytics information 203 (e.g., target of analytics information and/or analytics filter information). Such requested analytics information 203 can be related to specific UE(s) and/or groups of UEs, and/or an area of interest (e.g., list of TA(s), Cell(s)). For instance, there exist analytics information 203 that have as filters for subscription a specific geographical area, such as analytics IDs:

Service Experience (3GPP TS 23.288 in Clause 6.4) and User data congestion in a geographic area (3GPP TS 23.288 in Clause 6.8.1). In this case, NWDAF 200 has to identify the network slice association information 201/202 for the tuple "(TAs, Cells ID, network slices and/or network slices instances)" in order to properly identify the Cell IDs and or TA(s) that need to be used in the request for performance information, when NWDAF 200 interacts with OAM to collect such data for the specific area of interest. Therefore, in this example NWDAF 200 generates analytics information based on network slice association information, otherwise NWDAF 200 would not be able to determine the Cell IDs and/or TA(s) that are data sources for the requested analytics information 203.

Figure 9:
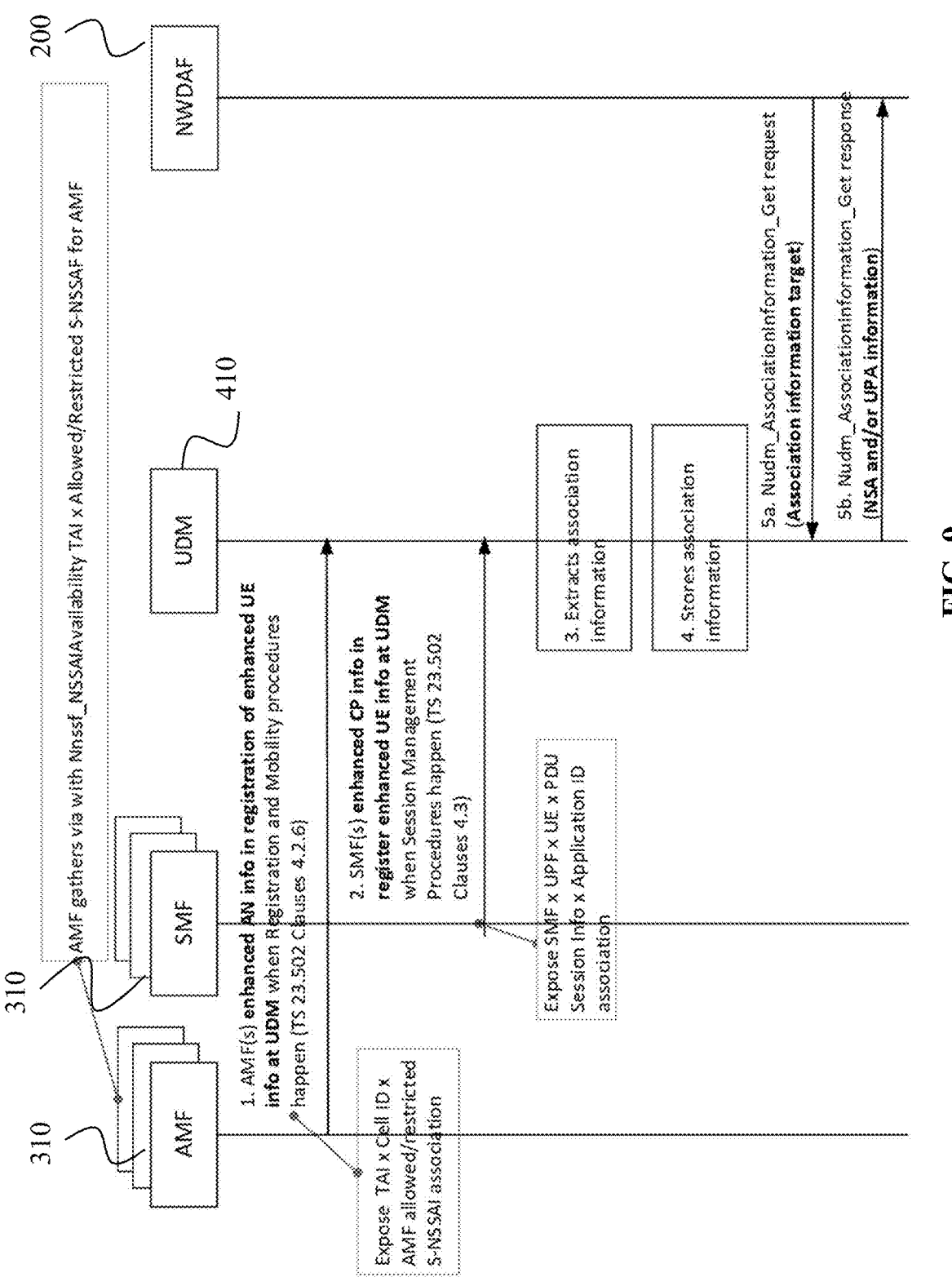
FIG. 9 shows an example embodiment of operation mode 3.

FIG. 9 illustrates the embodiment 3 of operation mode 3, and is based on NWDAF using UDM Existing Services for Collecting Association Information and New service for exposing Association Information to NWDAF:

In this embodiment 3, the proposed entities and concepts are mapped as follows:

The network entity 200 is exemplarily the NWDAF 200 for implementing the Analytics Function.

The AMF and SMF are exemplarily network entities 300 implementing NFs enhanced with association information.

The UDM is exemplarily the network entity 410 implementing an NF enhanced with centralization of association information (i.e., a determined NF 410).

The AMF 310 is the NF enhanced with association information that detects the NSA information 202, which comprises at least one of:

List of TA(s), for each TA, list of Cells identification with their related Access Types (e.g., eNB, or 5G NR, or non-3GPP, etc.), list of allowed S-NSSAI(s) and/or list of allowed NSI(s) that the AMF instance can support.

List of TA(s), for each TA, list of Cells identification with their related Access Types, list of restricted S-NSSAI(s) and/or restricted NSI(s) per PLMN for such AMF instance.

The SMF 310 is the NF enhanced with association information that detects the UPA information 202, which comprises at least one of:

List of UEs (e.g., identified by SUPI), for each UE a list of the UE PDU sessions identification (UL and/or DL), for each UE PDU session identification a list of UPFs and their N3 and N9 interfaces, or.

List of UEs (e.g., identified by SUPI), for each UE a list of UPFs transmitting the UE data traffic, for each UPF the list of N3 and/or N9 and/or N6 interfaces List of UEs (e.g., identified by User identity), for each UE list of NEF ID transmitting UL and/or DL for such UE.

The UDM 410 is the NF enhanced with centralization of association information, and is extended with new data structures to store and maintain the NSA information 201 and/or the UPA information 202.

The data structure for NSA information 201 can be indexed per:

S-NSSAI and/or NSI, where for each S-NSSAI and/or NSI, there is a list of TAs, for each TA, there is a list of related Cell IDs, and allowed AMFs, and restricted AMFs, or

TA, where for each TA, there is a list of cells, a list of S-NSSAIs and/or NSI, for each S-NSSAI and/or NSI a list of allowed AMFs and a list of restricted AMFs.

The data structure for UPA information 202 can be indexes in different ways, as for example per:

UE identification (e.g., SUPI) and/or UE group identification (e.g., Internal group identifier), where for each UE and/or UE group, there is a list of PDU sessions, for each PDU session, there is a the DNN and/or DNAI related to the PDU session, and a list of NF instance identification related to the transmission of data traffic of a PDU session, if the NF instance is a UP NF type, such as UPF NF Type, for each UPF NF ID there is a list of N3 and/or N9, and/or N6 interfaces associated with such UPF NF ID;

DN (i.e., DNN and/or DNAI), for each data network, there is a list of UE identification (e.g., SUPI) and/or UE group identification (e.g., Internal group identifier), where for each UE and/or UE group, there is a list of PDU sessions, for each PDU session, there is a list of NF instance identification related to the transmission of data traffic of a PDU session, if the NF instance is a UP NF type, such as UPF NF Type, for each UPF NF ID there is a list of N3 and/or N9, and/or N6 interfaces associated with such UPF NF ID;

In FIG. 9, the following steps are shown:

The UDM 410 may centralize the association information (e.g., the determined NF) 201/202 by obtaining from multiple NFs 310 the NSA and/or UPA information 201/202. In this embodiment, the option is considered, in which the NSA and/or UPA information 201/202 are obtained by UDM 410 via extension of existing services of UDM for acquiring UE context information from both AMF 310 and SMF 310. The UDM services for managing UE Context information are extended with the NSA 201 and UPA information 202. Therefore, whenever SMF 310 and AMF 310 update and/or create and/or deregister UE context information, the UDM 410 extracts (e.g., process, aggregates) from the enhanced UE Context information the NSA and the UPA information 201/202. In this case, UDM 410 obtain NSA and UPA information 201/202 from AMF 310 and SMF 310 upon changes in the UE context related for instance to UE changing its location in the network (e.g., change of TA, or cell ID), or UE being services by a different AMF 310; or establishment or modification of PDU sessions for an UE; or change on SMF 310 serving UEs; or change of UPF serving the PDU sessions (which is a new type of change we introduce with this invention).

1. AMF 310 invokes Nudm_UECM_Deregistration upon the need to remove from UDM 410 the information that such AMF 310 instance is serving a certain UE in the network because the S-NSSAI associated with the TA of the UE has changed from allowed to restricted. In this case, the Nudm_UECM_Deregistration service operation is extended with the NSA information 310, which may comprise at least one of the following input parameters: a list S-NSSAIs, for each S-NSSAI the list of TA(s) for which the TA status has changed (i.e., TA has become restricted/unrestricted in the S-NSSAI).

Another example of extensions is in Nudm_UECM_Registration service operation. In this case, AMF 310 invokes Nudm_UECM_Registration upon the need to include the information of a new NF in a TA serving an UE, which means that there is a change in NFs related to TA and S-NSSAIs from UDM 410 perspective. In this case, the input parameters of Nudm_UECM_Registration service operation are extended to include NSA information 210, which may comprise at least one of: when the NF type is AMF 310, list of TA, for each S-NSSAIs allowed for the UE under registration; and for each TA a list of Cell IDs.

2. SMF 310 invokes Nudm_UECM_Registration service operation upon the need to register a new PDU session being established for the UE, which means that there is a change in the overall mapping of core network properties and data traffic to/from UEs. For the NF type SMF 310, the input parameters are extended to reflect the UPA information 202, which may comprise at least one of: list of NF instances ID related to the transmission of the UEs data traffic, and for each NF instance a list of interfaces and/or reference points transmitting data traffic to and/or from the UE indicated in the Nudm_UECM_Registration service operation.

SMF 310 can also invoke the Nudm_UECM_Update service operation upon changes in the mapping of NF instances and/or interfaces and/or reference points being used for the transmission of the UE data traffic. In this case, the input parameters of Nudm_UECM_Update service operation are extended to include in the case of SMF 310 Type the UPA information 202 comprising of at least one of: the list of UEs that have some change in their sessions, for each UE the list of PDU sessions that changes, for each PDU session, the list of NF instance IDs transmitting the data traffic with the status (included, removed, updated), and for each NF instances IDs with status updated, the list of interfaces and/or reference points transmitting data traffic to and/or from the UE with their respective status (removed, included).

3. UDM 410 upon receiving the NSA and/or UPA information 201/202, respectively from AMF 310 and SMF 310, extracts from the input parameters received in service operation from the interface Nudm_UECM the related NSA and UPA information 201/202. From the received information via Nudm_UECM service interface, UDM 410 is also capable to identify the received NSA and/or UPA information 201/202 is associated with the indexes the UDM 410 uses for controlling the data structures for NSA and/or UPA information 201/202. By extracting the indexes and NSA and/or UPA information 201/02 from the input parameters from Nudm_UECM service operations, UDM 410 can assemble, compose (e.g., aggregate) the NSA and/or UPA information 201/202 for the value of the index and update existing entry or create a new entry in the data structure of the NSA and/or UPA information 201/202.

4. UDM 410 stores the extracted NSA and/or UPA information.

5. UDM 410 may be enhanced with a new service Nudm_AssociationInformation, wherein one of the possible embodiments for UDM 410 providing NSA and/or UPA information 201/202 to NWDAF 200 is as follows.

NWDAF 200 invokes the Nudm_AssociationInformation_Get request service operation from UDM 410 (i.e., determined NF). NWDAF 200 may query NRF to identify the proper UDM instance to invoke or it can be configured with the proper UDM instance.

NWDAF 200 includes as input parameters the following information: the type of association information 201/202 required (i.e., NSI and/or UPA), the association filter information for the respective type of the association information 201/202 required (i.e., the request for NSA and/or UPA information 201/202). The association filter information can be any of the fields of the NSA and/or UPA information 201/202, and it includes the values for such fields.

For instance, NWDAF 200 may include in invocation of Nudm_AssociationInformation_Get at least one of the following association filter information:

For UPA information 202, the association filter information can be at least one of: list of UE(s), or indication of "any UE", and/or groups of UEs, and/or DNN and/or DNAI information, and/or S-NSSAI(s) and/or NSI(s).

For NSA information 201, the association filter information can be at least one of: a list of AMFs 310 or any AMF 310; a list of cells or any cell, a list of S-NSSAIs and/or NSIs or any S-NSSAIs and/or NSIs.

This association filter information indicated by NWDAF 200 in the request for NSA and/or UPA information 201/202 to UDM 410, will be used by UDM 410 to search its internal NSA and/or UPA information 201/202 data structure, in order to retrieve (i.e., select) the entries that match the fields and values indicated in the association filter information.

The entries of the NSA and/or UPA information 201/202 data structure are included in Nudm_AssociationInformation_Get response that UDM 410 sends, i.e., provides to NWDAF. The possible output parameters are at least one of:

When NSA information 201 is provided: List of S-NSSAI and/or NSI, where for each S-NSSAI and/or NSI, there is a list of TAs, for each TA, there is a list of related Cell IDs, and allowed AMFs, and restricted AMFs When UPA information 202 is provided: list of UE identification (e.g., SUPI) or UE group identification (e.g., Internal group identifier), where for each UE or UE group identification, there is a list of PDU sessions, for each PDU session, there is a the DNN and/or DNAI related to the PDU session, and a list of NF instance identification related to the transmission of data traffic of a PDU session, if the NF instance is a UP NF type, such as UPF NF Type, for each UPF NF ID there is a list of N3 and/or N9, and/or N6 interfaces associated with such UPF NF ID.

Notably, the same type of embodiment of a service following the request-response method defined in the Nudm_AssociationInformation_Get, could be a possible embodiment for extensions of AMF 310 (or NSSF 310) and SMF 310 in the operation Mode 2.

Figure 10:
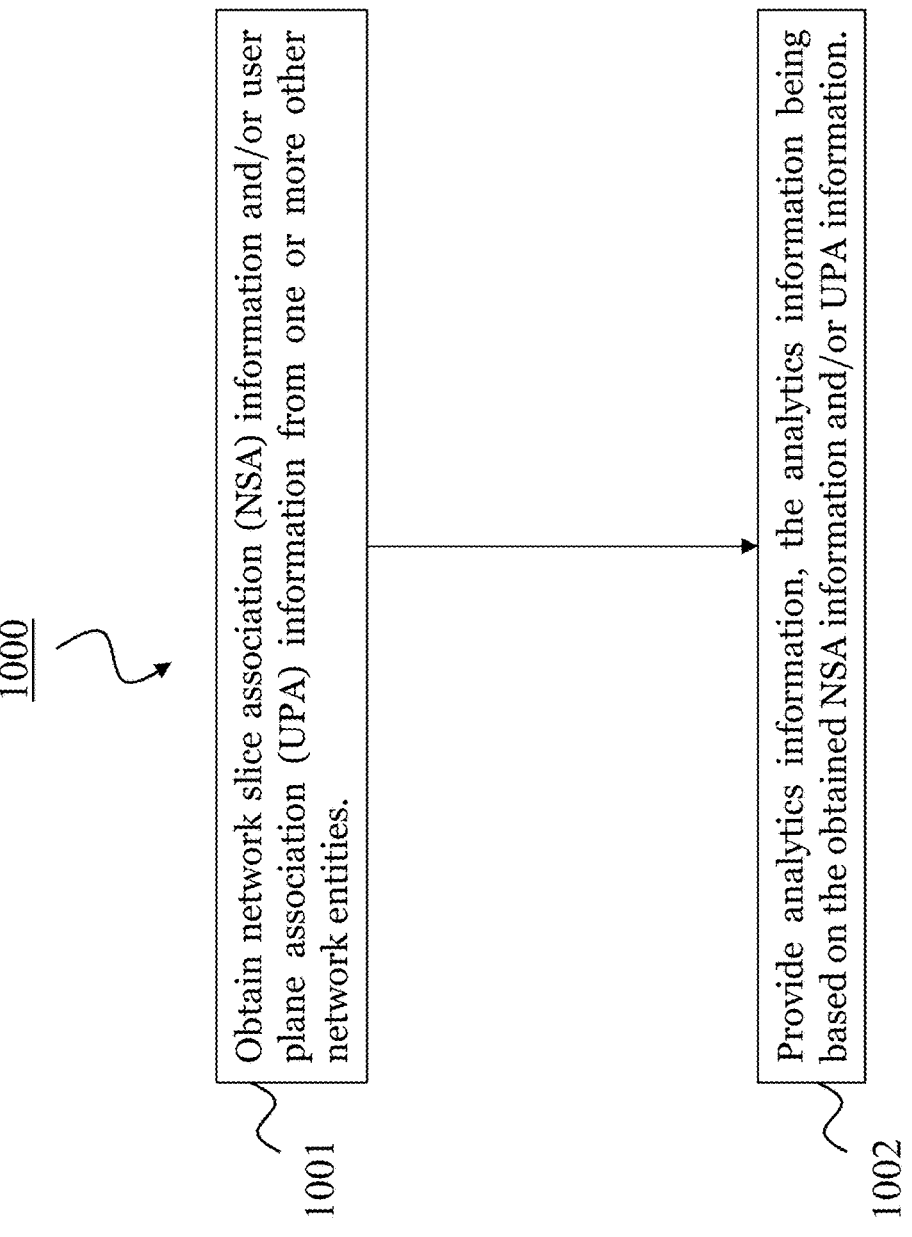
FIG. 10 shows a method for analytics generation, according to an embodiment of the invention.

FIG. 10 shows a method 1000 according to an embodiment of the invention. The method 1000 is usable for generating analytics. The method 1000 may be performed by the network entity 200 of FIG. 2.

The method 1000 comprises a step 1001 of obtaining NSA information 201 and/or UPA information 202 from one or more network entities 210, 310, 410, 510 (see e.g. FIG. 2-FIG. 5). Further, the method 1000 includes a step 1002 of providing analytics information 203, wherein the analytics information 203 is based on the obtained NSA information 201 and/or UPA information 202.

FIG. 11 shows three methods in (a), (b), and (c), respectively, according to embodiments of the invention.

In (a), a method 1100 for supporting analytics generation, e.g. performed by the network entity 200 of FIG. 2, is shown. The method 1100 may be performed by the network entity 310 of FIG. 3. The method 1100 comprises a step of providing NSA information 201 and/or UPA information 202 to another network entity 300, 400 (see FIG. 3 or FIG. 4), in response to a request 301, 401 received from and/or according to a subscription from the other network entity 300, 400. Alternatively, or in addition, the method 1100 includes a step of providing NSA information 201 and/or UPA information 202 to another network entity 300, 400, upon changes in one or more target elements related to the NSA information 201 and/or UPA information 202, the one or more target elements being related to the network entity 200 or 310. The other network entity 300, 400 may be the network entity of FIG. 2.

In (b) a method 1101 for supporting analytics generation, e.g. performed by the network entity 200 of FIG. 2, is shown. The method 1101 may be performed by the network entity 410 of FIG. 4. The method 1101 comprises a step of obtaining NSA information 201a and/or UPA information 202a from another network entity 420 (see e.g. FIG. 4), in response to a first request 411 sent to and/or according to a first subscription to the other network entity 420. Alternatively, or in addition, the method 1100 comprises a step of obtaining NSA information 201b and/or UPA information 202b from another network entity 420, upon changes in one or more target elements related to the NSA information 201 and/or UPA information 202, the one or more target elements being related to the other network entity 420.

In (c) a method 1102 for supporting analytics generation, e.g. as performed by the network entity 200 of FIG. 2, is shown. The method 1102 may be performed by the network entity 510 of FIG. 5. The method comprises a step of configuring a network entity 500 with NSA information 201 and/or UPA information 202, wherein the other network entity 500 is, in particular, a Network Data Analytics Function, NWDAF, and/or a Unified Data Management, UDM, and/or a Unified Data Repository, UDR, e.g. is the network entity 200 of FIG. 2.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A system for mobile operator network, the system comprising an access network (AN), a core network (CN), and a data network (DN), the system further comprising a core network entity, for operating within a control plane of the CN, for analytics generation, the core network entity comprising processing circuitry configured to carry out a method comprising:

obtaining network slice association (NSA) information from one or more other network entities, the NSA information indicating a relation between an access network property and a mobile operator core network property; and providing analytics information based on the obtained NSA information, wherein the NSA information comprises at least one information combination taken from the group consisting of:

a first combination comprising a cell related to a tracking area (TA), an access type, and at least one of the group consisting of:

one or more allowed single network slice selection assistance information (S-NSSAIs) or allowed network slice instances (NSIs), one or more restricted S-NSSAIs or restricted NSI(s), and one or more network functions (NFs), wherein for each NF, the NF is further related to at least one of the group consisting of:

one or more allowed S-NSSAI(s) per public land mobile network (PLMN), one or more allowed NSI(s) per PLMN, one or more restricted S-NSSAI(s) per PLMN, and one or more restricted NSI(s) per PLMN;

a second combination comprising a TA related to a list of cells, a supported access type, and at least one of the group consisting of:

one or more allowed S-NSSAI(s), one or more allowed NSI(s), and one or more NFs, wherein for each NF, the NF is further related to at least one of the group consisting of:

one or more allowed S-NSSAI(s) for each related NF, and one or more allowed NSI(s) for each related NF;

a third combination comprising a TA related to a list of cells, a supported access type, and at least one of the group consisting of:

one or more restricted S-NSSAI(s) or restricted NSI(s) per PLMN, or more NFs, wherein for each NF, the NF is further related to at least one of the group consisting of:

one or more restricted S-NSSAI(s) per PLMN, and one or more restricted NSI(s) per PLMN;

a fourth combination comprising a NF related to a TA, wherein the TA is further related to:

one or more cells, one or more access types, and one or more allowed S-NSSAI(s) per PLMN or allowed NSI(s) per PLMN; and a fifth combination comprising a NF related to a TA, wherein the TA is further related to:

one or more cells, one or more access types, and one or more related restricted S-NSSAI(s) per PLMN or restricted NSI(s) per PLMN;

wherein the obtaining NSA information comprises:

sending a plurality of requests or subscribing to a plurality of NFs; and obtaining the NSA information from the plurality of NFs in response to the plurality of requests or subscribing to the plurality of NFS;

wherein the method further comprises aggregating the NSA information obtained from the plurality of NFs; and wherein the providing analytics information comprises providing the analytics information based on the aggregated NSA information.

2. The system according to claim 1, wherein the obtaining NSA information comprises:

obtaining the NSA information according to a configuration from a management plane entity.

3. The system according to claim 1, wherein the obtaining NSA information comprises:

sending a request or subscribe to a determined network function (NF);

obtaining the NSA information from the determined NF in response to the request or according to the subscription; and wherein the providing analytics information comprises providing the analytics information is based on the NSA information obtained from the determined NF.

4. The system according to claim 1, wherein:

the core network entity comprises a network data analytics function (NWDAF).

5. A method for analytics generation, within a system for a mobile operator network, the system comprising an access network (AN), a core network (CN), and a data network (DN), wherein the method is carried out by a core network entity operating within a control plane of the CN of the mobile operator network, the method comprising:

obtaining network slice association (NSA) information from one or more other network entities, the NSA information indicating a relation between an access network property and a mobile operator core network property; and providing analytics information, the analytics information being based on the obtained NSA information, wherein the NSA information comprises at least one information combination taken from the group consisting of:

a first combination comprising a cell related to a tracking area (TA), an access type, and at least one of the group consisting of:

one or more allowed single network slice selection assistance information (S-NSSAIs) or allowed network slice instances (NSIs), one or more restricted S-NSSAIs or restricted NSI(s), and one or more network functions (NFs), wherein for each NF, the NF is further related to at least one of the group consisting of:

one or more allowed S-NSSAI(s) per public land mobile network (PLMN), one or more allowed NSI(s) per PLMN, one or more restricted S-NSSAI(s) per PLMN, and one or more restricted NSI(s) per PLMN;

a second combination comprising a TA related to a list of cells, a supported access type, and at least one of the group consisting of:

one or more allowed S-NSSAI(s), one or more allowed NSI(s), and one or more NFs, wherein for each NF, the NF is further related to at least one of the group consisting of:

one or more allowed S-NSSAI(s) for each related NF, and one or more allowed NSI(s) for each related NF;

a third combination comprising a TA related to a list of
cells, a supported access type, and at least one of the
group consisting of:
one or more restricted S-NSSAI(s) or restricted
NSI(s) per PLMN,
one or more NFs, wherein for each NF, the NF is
further related to at least one of the group con-
sisting of:
one or more restricted S-NSSAI(s) per PLMN,
and
one or more restricted NSI(s) per PLMN;
a fourth combination comprising a NF related to a TA,
wherein the TA is further related to:
one or more cells,
one or more access types, and
one or more allowed S-NSSAI(s) per PLMN or
allowed NSI(s) per PLMN; and
a fifth combination comprising a NF related to a TA,
wherein the TA is further related to:
one or more cells,
one or more access types, and
one or more related restricted S-NSSAI(s) per
PLMN or restricted NSI(s) per PLMN;
wherein the obtaining NSA information comprises:
sending a plurality of requests or subscribing to a
plurality of NFs; and
obtaining the NSA information from the plurality of
NFs in response to the plurality of requests or
subscribing to the plurality of NFs;
wherein the method further comprises aggregating the
NSA information obtained from the plurality of NFs;
and
wherein the providing analytics information comprises
providing the analytics information based on the aggre-
gated NSA information.

6. The method according to claim 5, wherein the obtaining
NSA information comprises:
obtaining the NSA information according to a configura-
tion from a management plane entity.

7. The method according to claim 5, wherein the-obtain-
ing NSA information comprises:
sending a request or subscribe to a determined network
function (NF);
obtaining the NSA information from the determined NF in
response to the request or according to the subscription;
and
wherein the providing analytics information comprises
providing the analytics information is based on the
NSA information obtained from the determined NF.

8. The method according to claim 5, wherein:
the core network entity comprises a network data analyt-
ics function (NWDAF).

9. A non-transitory computer readable medium compris-
ing a program code for performing, when executed on a
computer constituting a core network entity operating within
a control plane of a core network (CN) of a system for
mobile operator network, wherein the system comprises an
access network (AN), the CN, and a data network (DN), a
method for analytics generation comprising:
obtaining network slice association (NSA) information
from one or more other network entities, the NSA
information indicating a relation between an access
network property and a mobile operator core network
property; and
providing analytics information, the analytics information
being based on the obtained NSA information, wherein the NSA information comprises at least one
information combination taken from the group consist-
ing of:
a first combination comprising a cell related to a
tracking area (TA), an access type, and at least one
of the group consisting of:
one or more allowed single network slice selection
assistance information (S-NSSAIs) or allowed
network slice instances (NSIs),
one or more restricted S-NSSAIs or restricted
NSI(s), and
one or more network functions (NFs), wherein for
each NF, the NF is further related to at least one of
the group consisting of:
one or more allowed S-NSSAI(s) per public land
mobile network (PLMN),
one or more allowed NSI(s) per PLMN,
one or more restricted S-NSSAI(s) per PLMN,
and
one or more restricted NSI(s) per PLMN;
a second combination comprising a TA related to a list
of cells, a supported access type, and at least one of
the group consisting of:
one or more allowed S-NSSAI(s),
one or more allowed NSI(s), and
one or more NFs, wherein for each NF, the NF is
further related to at least one of the group con-
sisting of:
one or more allowed S-NSSAI(s) for each related
NF, and
one or more allowed NSI(s) for each related NF;
a third combination comprising a TA related to a list of
cells, a supported access type, and at least one of the
group consisting of:
one or more restricted S-NSSAI(s) or restricted
NSI(s) per PLMN,
one or more NFs, wherein for each NF, the NF is
further related to at least one of the group con-
sisting of:
one or more restricted S-NSSAI(s) per PLMN,
and
one or more restricted NSI(s) per PLMN;
a fourth combination comprising a NF related to a TA,
wherein the TA is further related to:
one or more cells,
one or more access types, and
one or more allowed S-NSSAI(s) per PLMN or
allowed NSI(s) per PLMN; and
a fifth combination comprising a NF related to a TA,
wherein the TA is further related to:
one or more cells,
one or more access types, and
one or more related restricted S-NSSAI(s) per
PLMN or restricted NSI(s) per PLMN;
wherein the obtaining NSA information comprises:
sending a plurality of requests or subscribing to a
plurality of NFs; and
obtaining the NSA information from the plurality of
NFs in response to the plurality of requests or
subscribing to the plurality of NFs;
wherein the method further comprises aggregating the
NSA information obtained from the plurality of NFs;
and
wherein the providing analytics information comprises
providing the analytics information based on the aggre-
gated NSA information.

10. The non-transitory computer readable medium according to claim 9, wherein the obtaining NSA information comprises:

obtaining the NSA information according to a configuration from a management plane entity.

11. The non-transitory computer readable medium according to claim 9, wherein the obtaining NSA information comprises:

sending a request or subscribe to a determined network function (NF);

obtaining the NSA information from the determined NF in response to the request or according to the subscription; and wherein the providing analytics information comprises providing the analytics information is based on the NSA information obtained from the determined NF.

12. The non-transitory computer readable medium according to claim 9, wherein:

the core network entity comprises a network data analytics function (NWDAF).

\* \* \* \* \*